United States Patent
Ghatak et al.

(10) Patent No.: US 11,080,629 B2
(45) Date of Patent: Aug. 3, 2021

(54) AUTOMATICALLY GENERATING ACTIVITY SUMMARIES BASED ON SIGNALS OBTAINED FROM PLURAL DEVICES AND LOGIC COMPONENTS

(71) Applicant: Microsoft Technology Licensing, LLC, Redmond, WA (US)

(72) Inventors: Kausik Ghatak, Bangalore (IN); Davis John, Bangalore (IN); Suyash Kumar Tiwari, Bangalore (IN); Swathy Thoppay Mothilal, Bangalore (IN); Christopher Yu, San Francisco, CA (US); Amit Singh, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 16/361,292

(22) Filed: Mar. 22, 2019

(65) Prior Publication Data
US 2020/0302372 A1 Sep. 24, 2020

(51) Int. Cl.
| | |
|---|---|
| *G06Q 10/06* | (2012.01) |
| *G06F 16/901* | (2019.01) |
| *G06Q 10/10* | (2012.01) |
| *H04L 29/08* | (2006.01) |

(52) U.S. Cl.
CPC . *G06Q 10/063114* (2013.01); *G06F 16/9024* (2019.01); *G06Q 10/0633* (2013.01); *G06Q 10/1091* (2013.01); *H04L 67/22* (2013.01)

(58) Field of Classification Search
CPC ....... G06Q 10/063114; G06Q 10/0633; G06Q 10/1091; G06F 16/9024
USPC ......................................................... 705/7.15
See application file for complete search history.

(56) References Cited

U.S. PATENT DOCUMENTS

| | | | |
|---|---|---|---|
| 8,036,679 | B1 | 10/2011 | Barbeau et al. |
| 8,588,870 | B1 | 11/2013 | Vargantwar |
| 9,418,366 | B1 | 8/2016 | Mayers |
| 9,721,305 | B2 | 8/2017 | Bomze et al. |
| 2007/0072583 | A1 | 3/2007 | Barbeau et al. |
| 2007/0088834 | A1 | 4/2007 | Litovski et al. |

(Continued)

FOREIGN PATENT DOCUMENTS

WO 2017146966 A1 8/2017

OTHER PUBLICATIONS

PCT Search Report and Written Opinion for PCT/US2020/022510, dated May 7, 2020, 15 pages.

(Continued)

*Primary Examiner* — Romain Jeanty

(57) ABSTRACT

A computer-implemented technique is described herein for receiving activity signals from plural logic components running on one or more computing devices. Each activity signal includes an activity information item (AII) that describes an activity performed by a subject (e.g., a user), or to be performed by the subject, as recorded by a logic component. The technique stores AIIs extracted from the activity signals in a graph data structure. The technique then: determines, by interrogating the graph data structure, one or more activity clusters within a span of time, each activity cluster pertaining to a group of AIIs associated with a same encompassing project; generates one or more summary documents based on the identified activity cluster(s); and sends the summary documents to an output device.

20 Claims, 17 Drawing Sheets

(56) References Cited

U.S. PATENT DOCUMENTS

| | | | |
|---|---|---|---|
| 2007/0184836 A1 | 8/2007 | He | |
| 2008/0221946 A1* | 9/2008 | Balon | G06Q 10/06313 |
| | | | 705/7.23 |
| 2010/0228469 A1 | 9/2010 | Varadarajan | |
| 2010/0305997 A1* | 12/2010 | Ananian | G06F 9/5038 |
| | | | 705/7.27 |
| 2012/0053978 A1* | 3/2012 | Andersen | G06Q 10/06 |
| | | | 705/7.14 |
| 2013/0090151 A1 | 4/2013 | Ngai et al. | |
| 2013/0091279 A1 | 4/2013 | Haddad et al. | |
| 2013/0103764 A1 | 4/2013 | Verkasalo | |
| 2013/0332214 A1* | 12/2013 | George | G16H 40/20 |
| | | | 705/7.15 |
| 2014/0006077 A1* | 1/2014 | Davis | G06Q 10/06311 |
| | | | 705/7.14 |
| 2014/0058778 A1* | 2/2014 | McLarty | G06Q 10/1095 |
| | | | 705/7.19 |
| 2014/0089043 A1 | 3/2014 | Weinstein et al. | |
| 2014/0095342 A1* | 4/2014 | Gowen | G06Q 30/00 |
| | | | 705/26.5 |
| 2014/0171064 A1 | 6/2014 | Das | |
| 2014/0278638 A1* | 9/2014 | Kreuzkamp | G06Q 10/06398 |
| | | | 705/7.15 |
| 2014/0310366 A1 | 10/2014 | Fu et al. | |
| 2015/0018014 A1 | 1/2015 | Phan | |
| 2015/0100363 A1* | 4/2015 | Bishop | G06F 16/93 |
| | | | 705/7.15 |
| 2015/0120336 A1 | 4/2015 | Grokop et al. | |
| 2015/0198722 A1 | 7/2015 | Ben-Akiva et al. | |
| 2015/0120555 A1 | 8/2015 | Jung et al. | |
| 2015/0288829 A1 | 10/2015 | Lu et al. | |
| 2015/0302531 A1 | 10/2015 | Thier et al. | |
| 2015/0379455 A1* | 12/2015 | Munzer | G06F 3/04842 |
| | | | 705/7.15 |
| 2016/0216123 A1 | 7/2016 | Liao et al. | |
| 2016/0300263 A1 | 10/2016 | Priness et al. | |
| 2017/0222892 A1 | 8/2017 | Brown et al. | |
| 2018/0082206 A1 | 3/2018 | Yang et al. | |
| 2018/0114148 A1 | 4/2018 | Balaji et al. | |
| 2018/0115866 A1 | 4/2018 | Gonzalez et al. | |
| 2020/0186967 A1 | 6/2020 | Ghatak et al. | |

OTHER PUBLICATIONS

Ghatak, et al., "Computer-Implemented Detection of a Work-Related Visit Based on Data from Movement-Sensing Mechanism(s)," U.S. Appl. No. 16/213,264, filed Dec. 7, 2018, 75 pages.

"MileIQ: How it Works," available at <<https://www.mileiq.com/howitworks>>, Microsoft Corporation, Redmond, WA, accessed on Mar. 24, 2019, 12 pages.

PCT Search Report and Written Opinion in PCT/US2019/063826, dated Mar. 20, 2020, 14 pages.

* cited by examiner

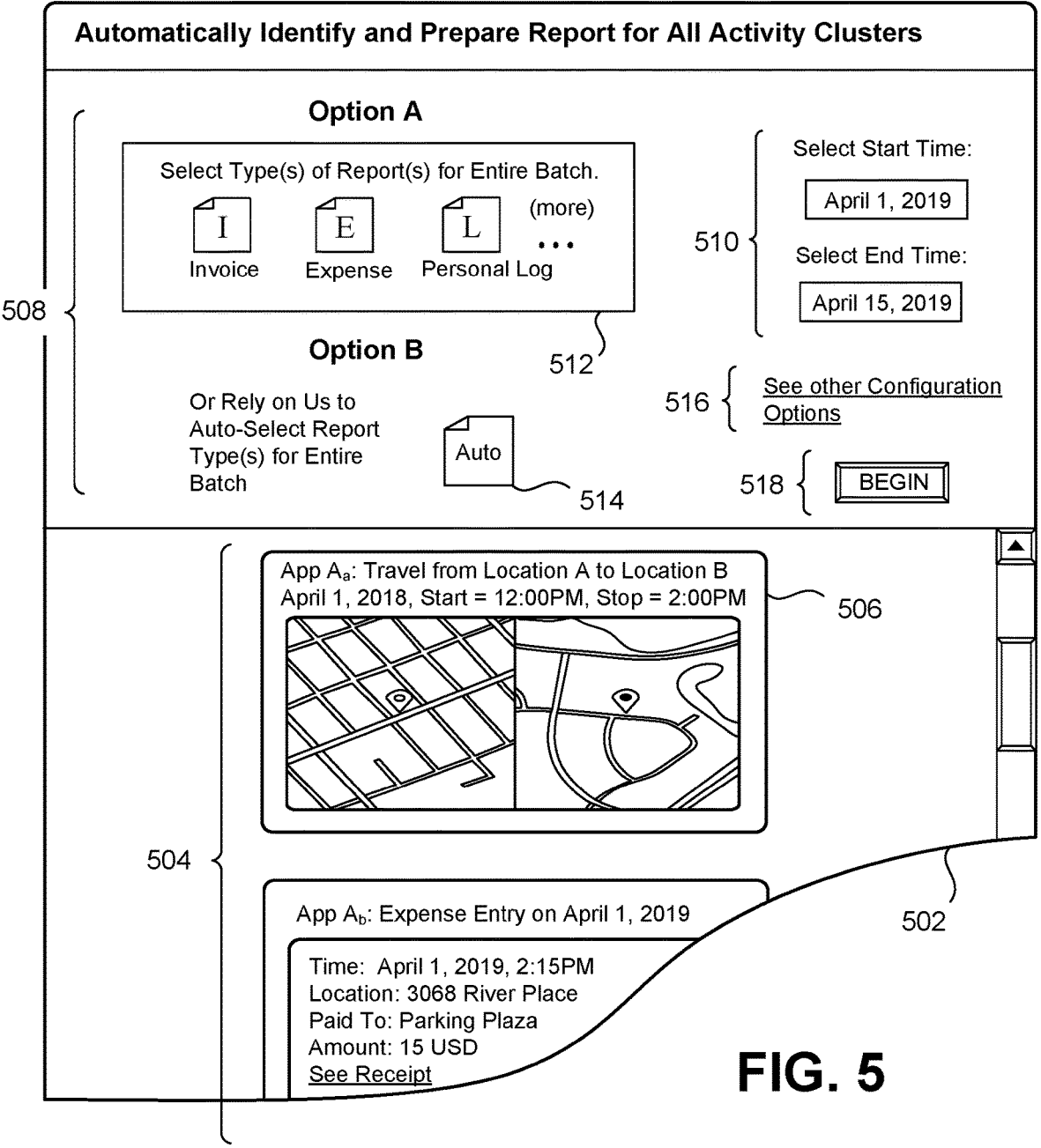

MyCompany Inc., Invoice for Services Rendered

To: Company $C_1$
123 Maple Street
Seattle, WA 98101

Invoice No. 920393
April 12, 2019

- Travel to and from site: April 1st, 2hrs.
- Parking: April 1st, $15 USD
- Site Visit: April 1st, 4 hrs
- Editing Photos: April 3rd, 2 hrs.
- Report Preparation: April 5th, 2 hrs.
- Phone Call: April 7th, 20 mins.

Total Due: $245 USD

Kindly remit payment to:
MyCompany Inc.
789 Elm Ave.
Seattle, WA 98101

Or click here for electronic bill payment.

Employee: Tom Hardy, Expense Report

- Travel to and from Company $C_1$: April 1st, 45.4 miles
- Parking: April 1st, Parking Plaza, $15 USD Click here to submit

OWN ORGANIZATION PROFILE
- COMPANY NAME: MYCOMPANY
- COMPANY LOCATION: 789 ELM AVE., SEATTLE, WA 98101
- COMPANY TYPE: HOME INSPECTION
- COMPANY STRUCTURE: SINGLE-OWNER COMPANY WITH 50 EMPLOYEES, AND A SINGLE HOME OFFICE
- COMPANY PATTERNS:
  - SERVES METROPOLITAN SEATTLE REGION, RADIUS 70 MILES
  - TYPICAL VISIT DURATION, 3-6 HRS.
  - ETC.
- REPORT TYPES IN CURRENT USE: INVOICE FORM I405, SUMMARY FORM S203
- ETC.

FIG. 12

USER PROFILE
- NAME: JOHN SMITH
- EMPLOYEE ID: MYCOMPANY030403
- ROLE: HOME INSPECTOR
- USER PATTERNS:
  - VISITS SITES ON MONDAYS AND TUESDAYS, PREPARES REPORTS WITHIN SEVEN DAYS THEREAFTER
  - TYPICAL VISIT DURATION, 4-5 HRS.
  - ETC.
- ETC.

FIG. 13

CLIENT PROFILE
- NAME: WESTSIDE APARTMENTS
- LOCATION: 123 MAPLE STREET, SEATTLE, WA 98101
- RELEVANT PATTERNS:
  - CLIENT PREFERS MONDAY MORNING INSPECTIONS
  - CLIENT PREFERS 5-10 PHOTOS PER APT., JPEG
  - ETC.
- ETC.

FIG. 14

OVERVIEW OF OPERATION OF THE COMPUTING ENVIRONMENT 2302

RECEIVE ACTIVITY SIGNALS FROM PLURAL LOGIC COMPONENTS RUNNING ON ONE OR MORE COMPUTING DEVICES ASSOCIATED WITH A SUBJECT (E.G., A USER), EACH ACTIVITY SIGNAL INCLUDING AN ACTIVITY INFORMATION ITEM (AII) THAT DESCRIBES AN ACTIVITY PERFORMED BY THE SUBJECT, OR TO BE PERFORMED BY THE SUBJECT, AS RECORDED BY A LOGIC COMPONENT.
2304

STORE AIIs EXTRACTED FROM THE ACTIVITY SIGNALS IN A GRAPH DATA STRUCTURE, THE GRAPH DATA STRUCTURE INCLUDING NODES ASSOCIATED WITH RESPECTIVE ENTITIES, AND LINKS BETWEEN THE NODES THAT DESCRIBE RELATIONSHIPS AMONG THE ENTITIES.
2306

RECEIVE AN INVOCATION EVENT THAT SIGNALS A START OF A SUMMARY-PREPARATION PROCESS.
2308

DETERMINE, BY INTERROGATING THE GRAPH DATA STRUCTURE, ONE OR MORE ACTIVITY CLUSTERS WITHIN A SPAN OF TIME, EACH ACTIVITY CLUSTER PERTAINING TO A GROUP OF AIIs ASSOCIATED WITH A SAME ENCOMPASSING PROJECT, THE AIIs IN EACH ACTIVITY CLUSTER BEING CONNECTED TOGETHER BY ONE OR MORE LINKS IN THE GRAPH DATA STRUCTURE.
2310

GENERATE, IN AT LEAST A SEMI-AUTOMATIC MANNER, ONE OR MORE SUMMARY DOCUMENTS BASED ON THE ONE OR MORE ACTIVITY CLUSTERS THAT ARE IDENTIFIED.
2312

SEND THE SUMMARY DOCUMENT(S) TO AN OUTPUT DEVICE.
2314

OPTIONALLY PRESENT, UPON REQUEST BY THE USER, ONE OR MORE USER INTERFACE PRESENTATIONS OVER A COURSE OF THE PROCESS.
2316

FIG. 23

AUTOMATICALLY GENERATING ACTIVITY SUMMARIES BASED ON SIGNALS OBTAINED FROM PLURAL DEVICES AND LOGIC COMPONENTS

BACKGROUND

Computing devices provide a wealth of signals that reflect activities performed by users over a span of time. But it is difficult to make constructive use of these signals in an effective and resource-efficient manner.

SUMMARY

A computer-implemented technique is described herein that provides an efficient way of capturing activity signals provided by a diverse collection of (logic components (e.g., applications, operating system components, etc.) running on one or more computing devices. Each activity signal describes an event recorded by a logic component, such as a task performed by a user using the logic component. The technique then automatically (or semi-automatically) generates summary documents based on the activity signals. The technique thereby reduces the need for the user to perform the burdensome and error-prone task of interacting with each logic component in a standalone manner to extract information therefrom.

Without limitation, the activity signals can include any of: movement signals (as captured by a movement-logging logic component) that describe trips taken by the user; document preparation signals (as captured by a document-processing logic component) that describe documents created and/or edited by the user; communication signals (as captured by a communication logic component) that describe communication activity undertaken by the user, and so on. The activity signals can also include software development signals that describe software developed and/or modified by the user, e.g., via integrated development environment (IDE) tools. The activity signals can also include calendar signals (as captured by a calendar logic component) that describe events that the user is scheduled to attend.

According to one illustrative aspect, the technique stores activity information items (AIIs) extracted from the activity signals in a graphical data structure. The technique then interrogates the graphical data structure in the course of generating the summary documents.

According to another illustrative aspect, the technique generates the summary documents by first identifying one or more activity clusters. Each activity cluster pertains to a group of AIIs associated with a same encompassing project. The technique can identify the activity clusters using a rules-based engine and/or a machine-trained model, etc.

According to another illustrative aspect, the technique presents a graphical user interface presentation that allows the user to control the process of generating summary documents. One such graphical user interface presentation shows a plurality of graphical cards associated with respective AIIs.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows a key for interpreting the labels used in FIG. 3.

FIG. 5 shows an illustrative user interface presentation that allows a user to initiate a summary-preparation process.

FIGS. 8 and 9 show illustrative types of summary documents that can be produced by the computing environment of FIG. 1.

FIG. 12 shows organization profile information provided by the graph data structure.

FIG. 13 shows user profile information provided by the graph data structure.

FIG. 14 shows client profile information provided by the graph data structure.

FIG. 23 is a flowchart that shows one illustrative manner of operation of computing environment of FIG. 2.

Figure 1:
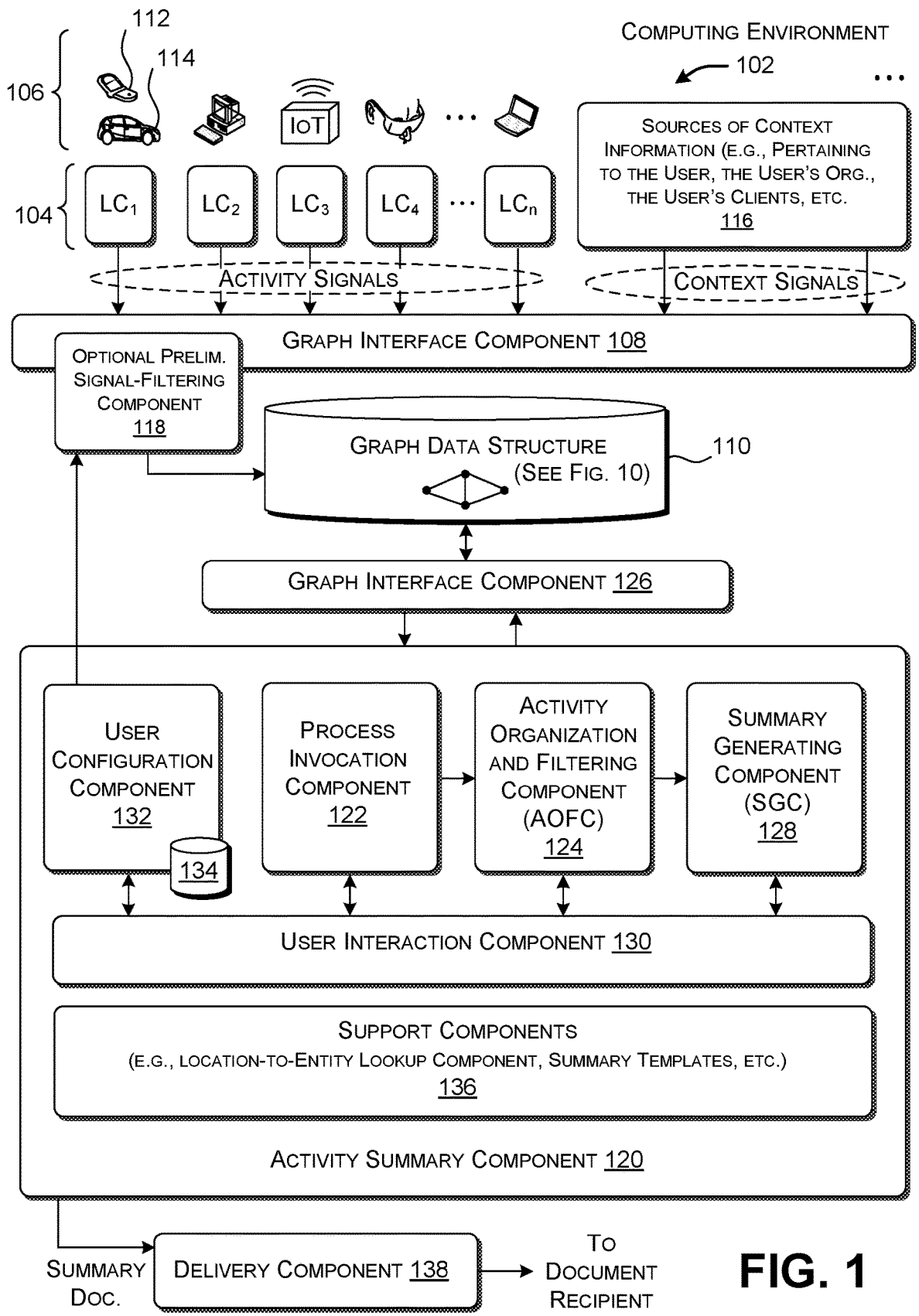
FIG. 1 shows an illustrative computing environment for generating summary documents in at least a semi-automated matter. Each summary document summarizes a set of activity information items (AIIs) associated with an overarching task performed by a user.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment that assists a user in generating summary documents. Section B sets forth illustrative methods which explain the operation of the computing environment of Section A. And Section C describes an illustrative computing device that can be used to implement any aspect of the features described in Sections A and B.

As a preliminary matter, the term "hardware logic circuitry" corresponds, at least in part, to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. Each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A.1. Overview

FIG. 1 shows an illustrative computing environment 102 for generating summary documents in at least a semi-automated matter. This subsection provides an overview of the illustrative composition and operation of the computing environment 102. Later subsections provide additional details regarding individual components of the computing environment 102.

As the term is used herein, a summary document refers to any document that summarizes a plurality of activities performed by a subject in any environment-specific context. For example, one kind of summary document corresponds to an invoice that itemizes work performed for a client, with a request for payment. Another kind of summary document corresponds to an expense report that itemizes expenses incurred by an employee, with a request for reimbursement. Another kind of summary document corresponds to a personal log of activities that a user prepares for his or her own personal use.

To facilitate explanation, the examples presented herein emphasize the case in which the computing environment 102 prepares summary documents for a single user based on activities that the user performs over a span of time. But the computing environment 102 can more broadly generate summary documents for a subject having any scope, such as an organization as a whole, or a group within the organization. A summary document for a group describes the activities performed by the plural users in the group. It should be kept in mind that any function described below in the context of a single user can be extended to a group of individuals.

To begin with, a plurality of logic components 104, running on one or more computing devices 106, generate activity signals. The computing devices 106 then forward the activity signals to an input graph interface component 108. An activity signal refers to a message that conveys an activity information item (AII). An AII, in turn, corresponds to digital data that describes an action performed by the user using a logic component, or, in the case of a calendar signal, an action to be performed by the user at a specified date and time. For example, in one merely illustrative implementation, the input graph interface component 108 provides a logic component programming interface (API) conforming to the representational state transfer (REST) standard. In that case, an activity signal corresponds to an API call that a logic component makes to the input graph interface component 108, requesting the input graph interface component 108 to store an AII. The AII corresponds to the digital payload of the call that describes the activity that has been performed, or which will be performed.

More specifically, for the case of an activity that has already taken place, an activity signal can express each AII as a data structure which contains one or more fields of information, including, but not limited to any of: a) a type of activity that has been performed; b) an identity of the user who performed the activity; c) the logic component on which the activity was performed; d) the device on which the activity was performed; e) the time at which the activity began; f) the time at which the activity ended, etc. In the special case of a calendar signal, an activity signal can express metadata regarding a scheduled event, such as any of: a) the date and time of the event; b) the location of the event; c) the duration of the event; d) the participant(s) of the event; e) the subject of the event, etc. Upon receipt, the input graph interface component 108 extracts the AII from each activity signal and stores the AII in a data store 110.

The term "computing device" is used broadly herein to refer to any electronic device that performs one or more functions by executing a program. Without limitation, the computing devices 106 which provide the activity signals can correspond to any combination of: desktop computing devices; a laptop computing devices; any kinds of portable handheld computing devices (such as smartphones, table-type computing devices, etc.); mixed-reality devices (such as head mounted displays); game consoles; wearable computing devices (such as wrist-worn computing devices, eyewear computing devices, etc.); intelligent appliances and other kinds of Internet-of-Thing (IoT) devices, etc. In general, note that the collection of computing devices 106 can run logic components using the same kind of operating system or two or more different types of operating systems.

The term "logic component" (LC) refers to any program logic, expressed in any form, that runs on a computing device of any type. Without limitation, a logic component can correspond to an application, an operating system component, a "hardwired" logic component, etc. Any logic component can work in conjunction with the computing environment 102 so long as it is configured to forward activity signals to the input graph interface component 108 in the API format expected by the input graph interface component 108. Different developers may provide these logic components. Without limitation, the logic components 104 which produce the activity signals can correspond to any combination of: movement-logging logic components that log movement of the user; visit-logging logic components which log the amount of time that a user spends at a particular site; document-processing logic components with which a user creates and/or edits a document of any kind; communication logic components with which a user communicates with one or more other people in any form (e.g., voice, text, video, Email, etc., or any combination thereof); image capture logic components with which a user takes digital photographs; video capture logic components with which a user produces digital videos; audio capture logic components with which a user produces audio files; expense-logging logic components with which a user records expenditures; software development logic components (such as integrated development environment (IDE) tools) with which a user creates software; mixed reality logic components with which a user interacts with a mixed reality environment for any purpose; Internet-of-Thing (IoT) logic components that run on intelligent devices with which the user interacts in a smart environment network, and so on. All of the above logic components provide activity signals that describe activities that have already taken place. As mentioned above, the logic components 104 can also include calendar logic components that convey information regarding an activity that is scheduled to happen in the future.

In one implementation, a movement-logging logic component can run on a portable computing device 112 that a user carries while he or she moves on foot or in any kind of vehicle 114 (such as a personal automobile). For instance, the portable computing device 112 can correspond to a smartphone or tablet-type computing device. The portable computing device 112 includes one or more movement-sensing devices (not shown in FIG. 1) which detect the user's traversal of space. For instance, the movement-sensing devices include various mechanisms for determining the position of the user at each instance of time, such as any of: a Global Positioning System (GPS) device; a dead-reckoning mechanism; a device which detects the position of the portable computing device 112 using triangulation based on signals received from one or more terrestrial wireless signals sources (such as cell towers, WIFI access points, BLUETOOTH BLE beacons, etc.), and so on. In addition, the movement-sensing devices include various mechanisms for detecting the dynamic movement of the user, such as any of: one or more accelerometers; one or more gyroscopes; one or more magnetometers, etc. Using any combination of these movement-sensing mechanisms, the movement-logging logic component determines that the user has started a journey when he or she departs from a state of motionlessness and remains in motion for more than a prescribed amount of time. The movement-logging logic component can determine that the user has arrived at a journey destination when he or she again returns to a state of motionlessness and remains in that state for more than a prescribed amount of time. Without limitation, one type of movement-sensing technology that can used to provide movement signals is described in U.S. Pat. No. 9,721,305 to Bomze, et al., issued on Aug. 1, 2017, and entitled "Mobile Device Distance Tracking." One type of commercial movement-sensing logic component that can be used to provide movement signals is the MileIQ application provided by MICROSOFT CORPORATION of Redmond, Wash.

One type of visit-logging logic component can determine the amount of time that a user spends at a particular site by using the above-identified technology to determine when the user has arrived at a prescribed location, and when the user subsequently leaves that location. The visit-logging logic component interprets the amount of time between the arrival and departure events as the duration of the visit. Without limitation, one type of technology that can be used to provide visit signals is described in copending U.S. patent application Ser. No. 16/213,264 to Ghatak, et al., filed on Dec. 7, 2018, and entitled "Computer-Implemented Detection of a Work-Related Visit Based on Data from Movement-Sensing Mechanism(s)." In one case, a single logic component can function as a movement-logging logic component (which determines the user's traversal of space from one location to another) and a visit-logging logic component (which determines the amount of time that a user spends at a particular destination).

The above-described types of movement-logging and visit-logging logic components should be interpreted in the spirit of illustration, not limitation. For instance, in another case, the vehicle 114 itself can include an onboard control system which includes a movement-logging logic component, instead of, or in addition to, relying on the portable computing device 112 to perform that function. In another case, a movement-logging logic component can rely on the user to manually specify the beginning and end of a journey, e.g., through key input, voice commands, etc. Similarly, a visit-logging logic component can rely on the user to manually specify the beginning and end of a visit.

The computing environment 102 can also include one or more sources 116 of context information regarding an environment in which the activity signals are provided. For example, assume that a user is an employee of a company which provides a service to a collection of clients. The sources 116 can provide profile information regarding the user, the user's company, and each of the user's clients. For instance, the user profile information can provide details regarding the user's name, profession, location, activity patterns, etc. The organization profile information can provide details regarding the organization's name, purpose, size, organizational structure, membership roster, reporting protocols, activity patterns, etc. The client profile information can provide each client's name, purpose, size, organizational structure, preferred reporting protocols, activity patterns, etc. As will be described below, the computing environment 102 can leverage this context information in generating summary documents.

The sources 116 convey the context information to the input graph interface component 108 via context signals. Like an activity signal, each context signal corresponds to a message that conveys a context information item (CII). A CII provides information regarding any of: the user; the user's organization; the user's client, etc. The sources 116 themselves may correspond to one or more computing devices of any type described above.

The input graph interface component 108 stores the AIIs and CIIs in a graph data structure. Subsection A.3 will describe one implementation of the graph data structure. By way of overview, the graph data structure organizes the information items as a collection of nodes connected together via a plurality of links. Each node corresponds to an entity, while each link between two nodes represents a relationship among two entities. An entity, as broadly used herein, refers to any focus of analysis, such a person, place, organization, location, document, calendar entry, etc.

An optional signal-filtering component 118 can determine which kinds of AIIs and CIIs are stored in the graph data structure, based on configuration information supplied by the user in advance. For example, assume that a user regularly plays games during lunchtime on his workplace computing device. That user can provide configuration information which instructs the signal-filtering component 118 to ignore activity signals that report the user's game-playing activity.

An activity summary component 120 generates one or more activity clusters for an identified subject (e.g., an individual user) based on AIIs in the graph data structure. Each activity cluster identifies a group of activities that the subject has performed, with respect to some overarching task. For example, assume that a lawyer performs a series of tasks in connection with preparing a contract for a client. The activity summary component 120 can generate an activity cluster which assigns the same cluster ID to all of these tasks, effectively binding them together. The activity summary component 120 then generates a summary document that describes each activity cluster. In the above-noted example of the lawyer, the activity summary component 120 can generate an invoice for the work he has performed in preparing the contract. Again, to facilitate explanation, this description will set forth the operation of the activity summary component 120 for those cases in which the subject of analysis is an individual user. But more generally, the activity summary component 120 can generate summary documents for a subject having any scope.

A process invocation component 122 invokes the process of generating one or more summary documents. In one implementation, the process invocation component 122 can commence the process when the user provides an explicit command to do so. As will be described in Subsection A.2., the process invocation component 122 can also optionally receive instructions from the user regarding the type of summary document to be generated. Or the process invocation component 122 can infer the type of summary document to be generated based on the AIIs in conjunction with the profile information extracted from the graph data structure. In another implementation, the process invocation component 122 can commence processing in a periodic manner, e.g., at the end of each week or other reporting period. Or the process invocation component 122 can automatically commence processing in an event-driven manner, e.g., in response to the receipt of a prescribed number of new activity signals.

An activity organization and filtering component (AOFC) 124 automatically organizes the AIIs in the graph data structure into one or more activity clusters. As will be described in Subsection A.3, The AOFC 124 can perform this task using a rules-based engine and/or a machine-trained model. By way of preview, in one rules-based approach, the AOFC 124 can identify a calendar event that specifies a client visit. The AOFC 124 can then cull all of the AIIs within a prescribed time window surrounding this event. It can then choose all of the AIIs that are necessary to fill in the required slots of a chosen summary template document (such as an invoice document).

The AOFC 124 interacts with the graph data structure via an output graph interface component 126. For example, the output graph interface component 126 can implement a REST API. The AOFC 124 can interrogate the graph data structure by issuing GET calls to the graph data structure via the output graph interface component 126. Note that the output graph interface component 126 may correspond to the same program logic as the input graph interface component 108. FIG. 1 separates this logic based on whether it is serving the role of inputting information to the graph data structure or retrieving information from the graph data structure.

A summary generating component (SGC) 128 prepares a summary document based on the activity cluster(s) identified by the AOFC 124. In one implementation, the SGC 128 performs this task by using a lookup table to map each AII in an activity cluster into a text snippet, and then inserting that text snippet into a predetermined slot of the summary document. For example, in preparing an invoice, the SGC 128 can convert a mileage reading into the text snippet, "miles driven, 46.5 miles," and then insert that text snippet into a predetermined slot of the invoice document.

A user interaction component 130 provides one or more user interface presentations. For example, as described in Subsection A.2 (below), the user interaction component 130 can provide a user interface presentation which shows a series of graphical cards, each card describing a received AII. The user interaction component 130 can also display the activity clusters generated by the AOFC 124 and the summary documents generated by the SGC 128.

A user configuration component 132 stores user settings (in a data store 134) which govern the operation of the activity summary component 120. For example, the user configuration component 132 can allow the user to control how the user interaction component 130 displays AIIs, activity clusters, and summary documents. The user configuration component 132 can also allow the user to choose the algorithm (or model) used by the AOFC 124 and the SGC 128, and the parameter values associated with that algorithm (or model). The user configuration component 132 can also allow the user to choose a list of AII types to be excluded by the signal-filtering component 118.

The activity summary component 120 also hosts one or more support components 136 that the above-mentioned components can draw from in performing their respective functions. For example, the activity summary component 120 can provide a data store that provides a plurality of summary document templates associated with different summary documents. The activity summary component 120 can also provide a location-to-entity lookup component which maps a specified location to an entity (e.g., a business name) associated with that location. The activity summary component 120 can also provide a telephone-number-to-entity lookup component which maps a specified telephone number to an entity (e.g., a business name) associated with that telephone number.

Finally, a delivery component 138 provides the summary document(s) generated by the activity summary component 120 to any appropriate recipient. For example, the delivery component 138 can correspond to a communication component (e.g., an Email logic component) that delivers an electronic version of an invoice document to a client (e.g., as an attachment to an Email message). An electronic summary document may include one or more links that a recipient can activate to access an electronic payment system. Alternatively, the delivery component 138 may correspond to printer software which sends a summary document to a printer, to produce a hardcopy version of the summary document for mailing to a recipient via a physical mail service. More generally, the delivery component 138 can be said to provide the summary document(s) to an output device, where the output device may correspond to a display device provided by a recipient computing device, a printer, etc.

Figure 2:
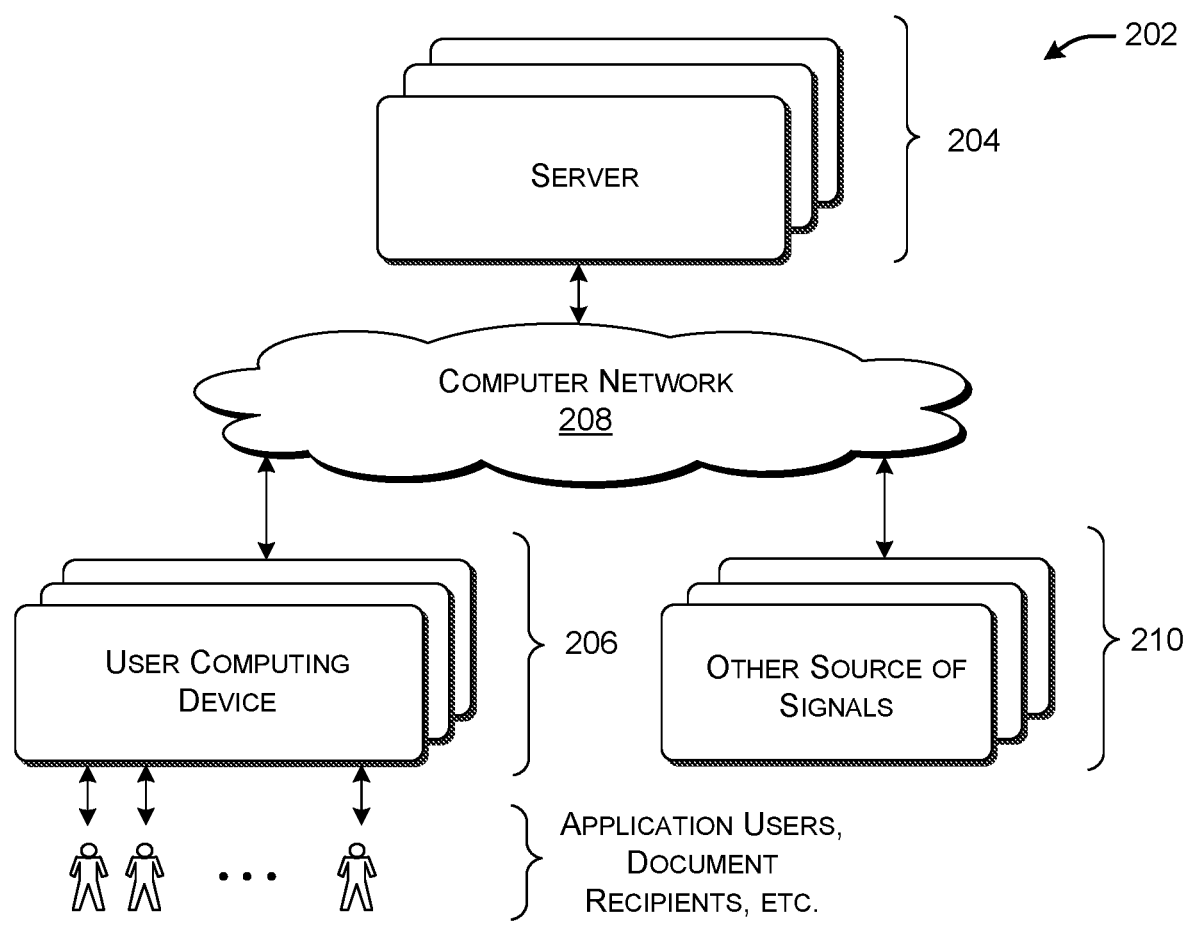
FIG. 2 shows illustrative computing equipment for implementing the computing environment of FIG. 1.

FIG. 2 shows illustrative computing equipment 202 for implementing the computing environment 102 of FIG. 1. The computing environment 102 includes one or more servers 204 provided at one or more locations, a plurality of user computing devices 206, and a computer network 208 for communicatively connecting the servers 204 and the user computing devices 206. The user computing devices 206 can correspond to any of the types of user devices described above. The users who interact with the user computing devices 206 can correspond to any of: users who interact with logic components in the course of performing work (and, in the process, producing activity signals); users who interact with the user interaction component 130 in the course of generating summary documents; individuals who receive summary documents via the delivery component 138, etc. The computer network 208 can correspond to a wide area network (e.g., the Internet), a local area network, one or more point-to-point links, or any combination thereof.

The functionality of the computing environment 102 can be distributed among the components shown in FIG. 2 in any manner. For example, in one implementation, the user computing devices 206 implement the various logic components 106 described above, while the servers 204 implement the remainder of the functionality shown in FIG. 1. In another implementation, at least some functions associated with the activity summary component 120 can be performed in local fashion by each user computing device. Alternatively, or in addition, at least some functions of individual logic components can be performed by the servers 204.

In one implementation, the servers 204 can implement the data store 110 which provides the graph data structure, together with the graph interface components (108, 126). Each user computing device can optionally also store some portion of the graph data structure. For example, a user computing device associated with a user in an organization can store that portion of the graph data structure relevant to the user and his organization. The servers 204 can include a syncing mechanism which insures consistency among all copies of the graph data structure across the computing environment 102.

FIG. 2 also shows that the computing equipment 202 can also include other sources 210 of activity signals and/or context signals that do not constitute user computing devices. For example, one such source may correspond to a control mechanism integrated with the vehicle 114 which provides movement signals to the input graph interface component 108.

Figure 3:
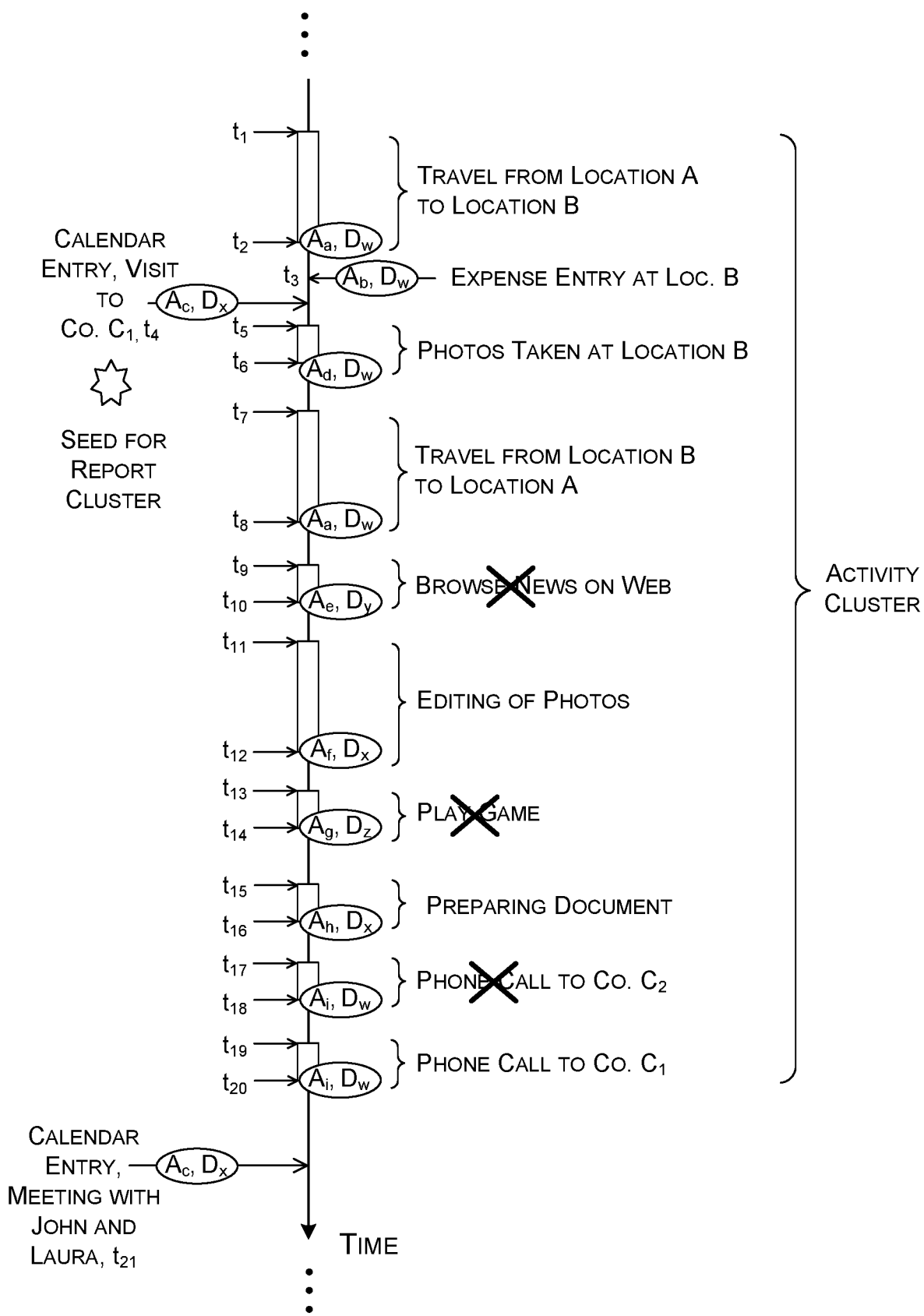
FIG. 3 shows an illustrative collection of AIIs, corresponding to activities performed by the user within a span of time.

FIG. 3 shows an illustrative collection of AIIs, corresponding to activities performed by the user within a span of time, or, in the case of calendar signals, activities that the user is scheduled to performed within this span of time. More specifically, this figure shows a timeline having a plurality of task segments. Each segment corresponds to an activity that commences at a starting time $t_{start}$ and terminates at an ending time $t_{end}$. FIG. 3 annotates each segment with a label that describes the device and logic component (here, an application) that the user used to perform the activity. FIG. 4 provide a key to the labels shown in FIG. 3.

In the scenario shown in FIG. 3, assume that the user is an employee of an inspection company that inspects properties for any commercial purpose. The user begins a work assignment by traveling to a property associated with a client to inspect it. A movement-logging logic component sends activity signals to the input graph interface component 108 that describes the user's movement to and from the site. Although not shown in FIG. 3, a visit-logging logic component can provide an activity signal which identifies the amount of time that the user spends at the property, which correspond to the span to time between the user's arrival at the site and the user's subsequent departure from the site. As noted, a single logic component can alternatively perform the functions of the movement-logging logic component and the visit-logging logic component. Upon arrival at the client's site, assume that the user interacts with an expense-logging logic component to record a parking fee. Assume that the user also interacts with a note-taking logic component and/or a photo-taking logic component at the site to record his or her impressions of the condition of property.

When the user returns to his home office, the user interacts with a photo-editing logic component to crop the photos he took at the property site. He also interacts with a word-processing logic component to prepare a report of his visit. Finally, he uses a communication logic component to interact with the client during the report-preparation process. Each of these events generates an activity signal that describes the activity that has been completed. Note that the user also performs a variety of errant tasks captured by the computing environment 102, corresponding to activity that cannot be billed to the client. For example, the user uses to a web browser to visit a news site. He also interacts with a game logic component to play a game. He also may perform one or more tasks for another client, interspersed with work performed for the above-mentioned client that he recently visited.

The left side of the timeline also shows AIIs associated with calendar events that fall within the time span shown in FIG. 3. For example, assume that a user interacts with a calendar logic component three weeks prior to visiting the client to schedule a site visit. FIG. 3 shows an entry for this calendar entry positioned on the timeline at the time at which the visit is scheduled to take place, not the time at which the user interacted with the calendar logic component.

The AOFC 124 can use any rules-based engine or machine-learned model to identify the subset of events which pertain to the user's site inspection and subsequent analysis. The SGC 128 then generates a summary document based on the entries in the activity cluster. Again, Subsection A.4 will provide examples of how the AOFC 124 and SGC 128 can perform these tasks.

In summary to Subsection A.1, the computing environment 102 facilitates the user's preparation of summary documents. That is, the activity summary component 120 automatically receives activity signals from a diverse collection of logic components 104 and devices 106 used by the user, and then automatically organizes the AIIs extracted therefrom into summary documents. The user is thereby freed from the burdensome and error-prone task of manually extracting data from separate logic components, and manually integrating the data into summary documents. The computing environment 102 also makes efficient use of computing resources insofar as it allows the user to generate summary documents in a reduced amount of time, compared to the above-noted manual procedure.

A.2. Illustrative User Interface Experience

This subsection describes various user interface (UI) presentations that the user interaction component 130 can present to a user. Note that these UI presentations are described in the spirit of illustration, not limitation; other implementations can vary the appearance and functionality of these UI presentations in any manner.

In the example of FIG. 5, the user interaction component 130 presents an activity UI presentation 502 that shows a plurality of graphical cards 504 associated with respective activity information items (AIIs). The user interaction component 130 generates each card based on information extracted from the AII. For example, assume that a movement-logging logic component produces a first AII that describes the user's travel from a first location to a second location. A first graphical card 506 can identify salient information reading this event, such as the logic component which generated the AII, the time at which the user performed the activity, etc. In this case, the first graphical card 506 also provides a first graphical map snippet showing the user's starting location and a second graphical graph snippet showing the user's destination location. The user interaction component 130 can generate these map snippets based location information specified by the AII, together with digital map information accessible to the user interaction component 130. Further note that the user interaction component 130 arranges the graphical cards in a temporal series, corresponding to the times at which the activities associated with the cards were started or completed. In the special case of a calendar signal, the user interaction component 130 displays a graphical card along this timeline corresponding to the time at which the event is scheduled to occur, not the time at which the user created the calendar entry.

The user interaction component 130 also shows a section 508 that includes graphical controls that the user may activate to commence the summary-preparation process. As a first step, the user may interact with a time-picker graphical control 510 to specify a starting time and ending time. Once invoked, the activity summary component 120 will analyze the AIIs that fall within the time span bounded by these times. As a second step, the user may interact with a graphical control 512 to choose what kind(s) of summary document(s) he or she desires. Once invoked, the activity summary component 120 will generate one or more summary documents of the specified type(s) for the time span under consideration. Alternatively, the user may interact with a graphical control 514 to instruct the activity summary component 120 to automatically choose the summary document type(s) that are appropriate to the AIIs in the time span. As will be described in Subsection A.4 below, the activity summary component 120 can automatically choose a summary document type based on information extracted from the AIIs and/or the profile information provided in the graph data structure.

The section 508 can present yet other configuration options. For instance, the user may click on a link 516 to access a separate page which provides additional configuration options. The user may commence the summary-preparation process by clicking on a "begin" graphical control 518.

Figure 6:
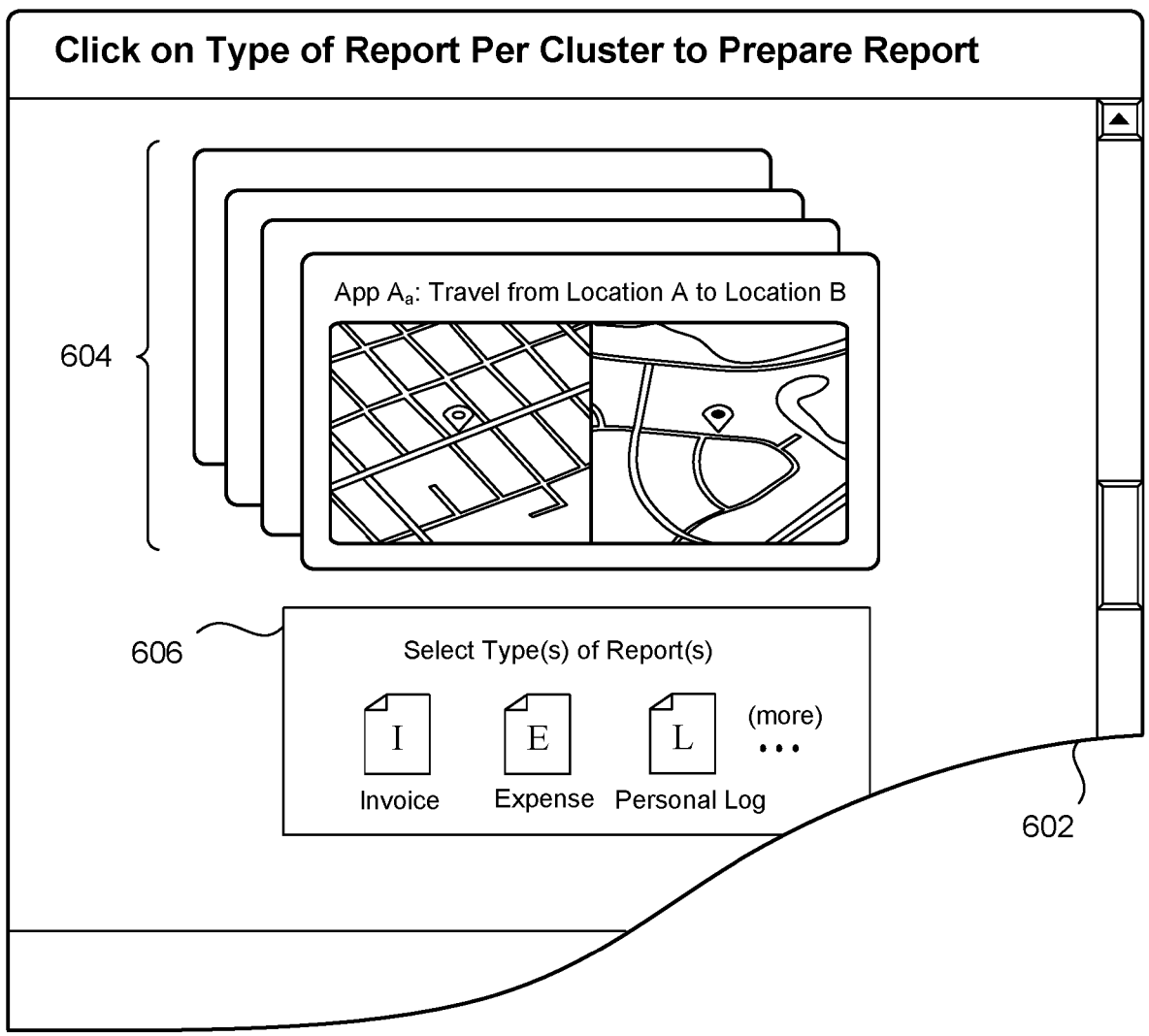
FIG. 6 shows an illustrative user interface presentation that allows a user to choose a type of summary document to be applied to an identified activity cluster.

Advancing to FIG. 6, this figure shows an alternative UI presentation 602 for controlling the summary-preparation process. Here, the activity summary component 120 automatically generates candidate activity clusters for a specified period of time, such as the last 30 days. The user interaction component 130 then displays a set of graphical cards (such as a set 604) for each identified activity cluster. The user interaction component 130 also displays a graphical control for each set (such as graphical control 606) which allows the user to choose the type(s) of summary document(s) to be prepared for the set. Note that that different types of summary documents require different subsets of AIIs. Hence, not all of the graphical cards in the set 604 may contribute to the summary document that the activity summary document 120 generates for the user.

Figure 7:
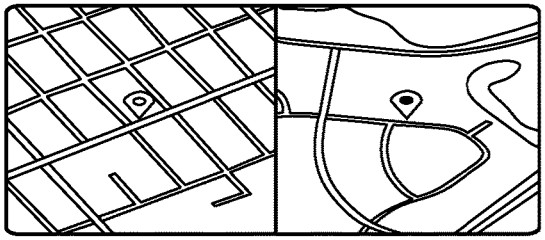
FIG. 7 shows an illustrative user interface presentation that allows a user to edit activity clusters proposed by the computing environment of FIG. 1.

FIG. 7 shows a cluster detail UI presentation 702 that allows a user to edit the classification decisions made by the activity summary component 120. The user interaction component 130 provides a first section 704 which displays a series of graphical cards that describe respective AIIs. It provides a second section 706 that displays the proposed classification decisions of the activity summary component 120 on a per-card basis. For instance, the user interaction component 130 indicates that all three of the graphical cards in the second section 706 pertain to the same activity cluster, having the cluster ID AC304.

The user interaction component 130 can allow a user to edit the individual classifications in any manner. In one technique, the user interaction component 130 allows the user to reclassify a graphical card by tapping on it. This prompts the user interaction component 130 to display a popup panel (not shown) which invites the user to edit the classification information associated with the graphical card. Or the user interaction component 130 can display plural sets of graphical cards associated with different activity clusters on a touch-sensitive display device. The user interaction component 130 then allows a user to change the classification of any graphical card (and the AII associated therewith) by dragging the graphical card from its original activity cluster to a new activity cluster. The user interaction component 130 can allow a user to delete any graphical card by performing any telltale gesture, such as by swiping on the graphical card, double-tapping on the graphical card, dragging the graphical card to an icon that represents a trash bin, etc.

In some implementations, as will be described below, the AOFC 124 generates each activity cluster based on the selection of a seed AII. For example, the AOFC 124 can identify a meeting event that involves interaction with a client. The AOFC 124 can then form an activity cluster that includes AIIs that occur within a time window that encompasses the meeting event. The user interaction component 130 can highlight the graphical card associated with this seed AII. In the case of FIG. 7, the user interaction component 130 indicates that the third graphical card 708 corresponds to a seed AII. The user interaction component 130 can also include control functionality which allows a user to manually select a new seed AII, e.g., by tapping on the graphical card 708 to edits its status.

FIG. 8 shows one kind of invoice document 802 generated by the activity summary component 120, while FIG. 9 shows one kind of expense report document 902 generated by the activity summary component 120. The SGC 128 can prepare each document using a predetermined summary document template. Each summary document template includes a plurality of slots. The SGC 128 generates each summary document by inserting information extracted from the AIIs into appropriate slots. The delivery component 138 provides each summary document to the appropriate recipient(s) in the manner described in Subsection A.1. The user interaction component 130 can also display each summary document, and/or a digest thereof, in a summary document UI presentation.

Figure 10:
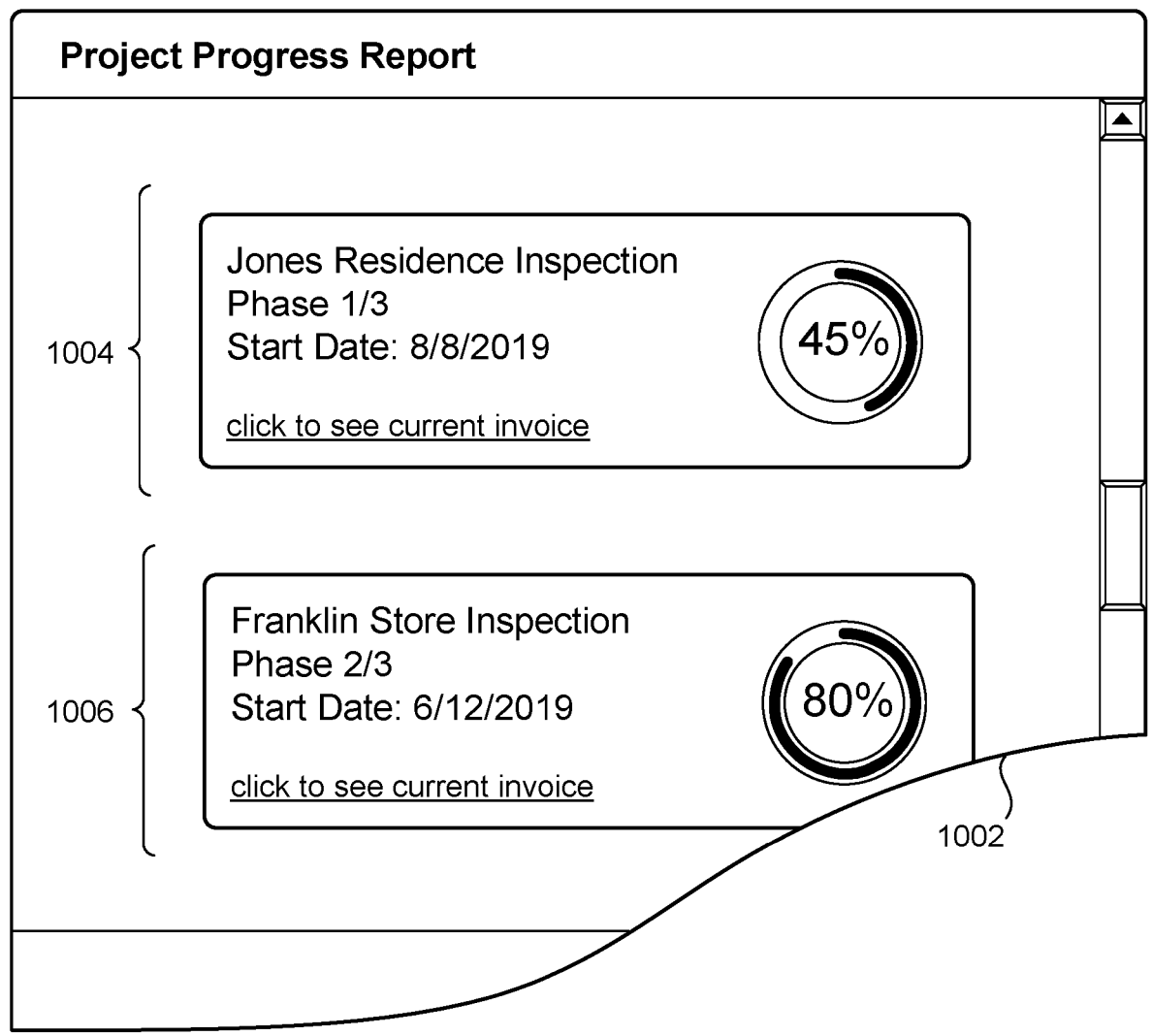
FIG. 10 shows an illustrative user interface presentation that displays a user's progress in completing projects, each project involving plural billable subtasks.

FIG. 10 shows an illustrative project overview UI presentation 1002 that displays a user's progress in completing projects, each of which includes plural billable subtasks. For example, again consider the scenario of FIG. 3. Assume that the inspection company routinely provides a service to its clients that includes three tasks. In a first stage, the company visits a site to perform the inspection. In a second task, the company prepares an inspection report in its home office. In a third task, the company discusses the inspection report with the client, typically via telephonic communication. Further assume that this company charges three different rates for these respective tasks. In this context, FIG. 10 shows a first graphical card 1004 which indicates that the user has currently completed the first phase of the three-part job for a first client. FIG. 10 shows a second graphical card 1006 which indicates that the user has currently completed the first two phases of the three-part inspection job for a second client. Each graphical card includes a link which, upon activation, directs the user to a page (not shown) that shows an itemized list of the activities that have been completed to date, and the billable amounts associated therewith.

The AOFC 124 can detect the completion of each phase in various ways. In one approach, the graph data structure can store company profile information which identifies the tri-part nature of its service. It can also identify the rates associated with each phase. It can also describe telltale activity that indicates when a phase may be considered completed. For example, the profile information may indicate that a trip back to a home office at the completion of a site visit marks the end of the site-inspection phase. The profile information may indicate that the transmission of an inspection report to the client designates the completion of the report-preparation phase. The profile information may indicate that the completion of a phone call to the client, following the transmission of the report to the client, marks the completion of the third phase. In another implementation, the user (the person who is performing the inspection work) provides explicit signals that designate the end of each phase.

A.3. Illustrative Graph Data Structure

Figure 11:
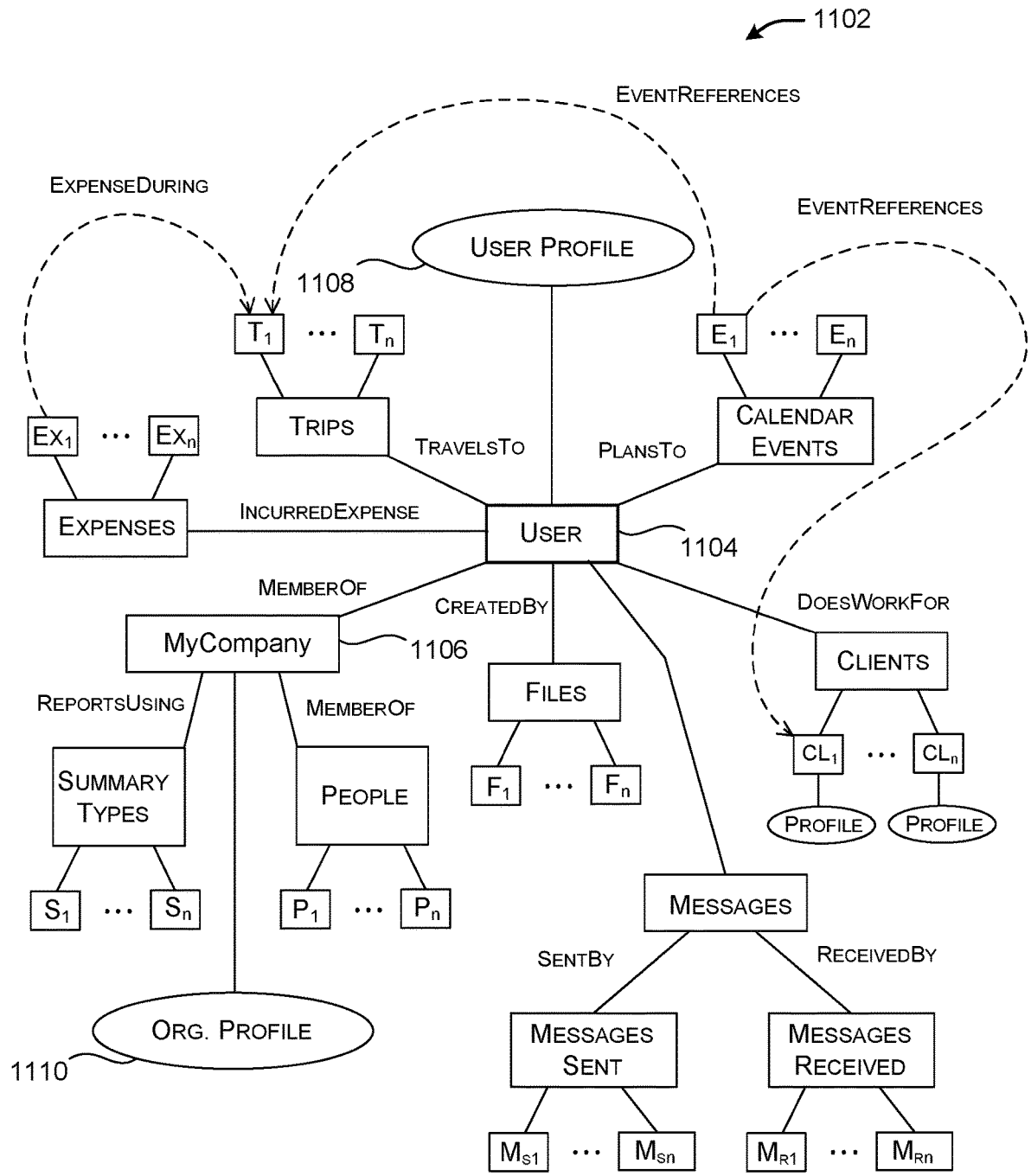
FIG. 11 shows an illustrative graph data structure used by the computing environment of FIG. 1.

FIG. 11 shows an illustrative graph data structure 1102 used by the computing environment 102 of FIG. 1. The graph data structure 1102 includes a plurality of nodes that represent entities, or, more colloquially, "things" associated with the user's activities. In this case, a hub node 1104 represents the user. Without limitation, other nodes correspond to the user's company, the user's expenses, the user's trips, the user's calendar events, the user's clients, the user's messages (both sent and received), and the user's files, etc. The graph data structure 1102 also includes a plurality of links between nodes. Each link represents a relationship between entities. For example, a link between the user and a file represents the fact that the user created or modified that particular file. Note that, to facilitate illustration, FIG. 11 only shows a small subset of the possible links between nodes.

Each satellite node may itself serve as a hub to one or more other nodes. For example, a company node 1106 represents the user's company. That node is connected to nodes that describe other people affiliated with the company, the summary documents used by the company, and so on. Similarly, each client node may itself serve as a hub node with respect to a constellation of linked nodes.

Each node can also have a collection of properties. For example, the user node 1104 is associated with profile information 1108 that describes various properties of the user, while the company node 1106 is associated with profile information 1110 that describes various properties regarding the user's company. Each client node is likewise associated with profile information that describes various properties regarding an associated client. Each node associated with an activity (e.g., a trip node) also includes various properties, such as an indication of: when the activity occurred; how long the activity lasted; where the activity occurred; who was involved in the activity, etc.

The data structure shown in FIG. 11 should be interpreted in the spirit of illustration, not limitation. Other implementations of the graph data structure 1102 can arrange information using a different taxonomy of node types, and/or different manner of arranging the nodes.

FIG. 12 shows illustrative profile information 1010 that describes the user's company. The profile information 1008 describes the name, location, and company type associated with the user's company. The profile information 1008 also stores pattern information that describes the activity patterns characteristic of the company. For example, the profile information 1008 indicates that the user's company most typically makes visits within a radius of 70 miles of its home office in Seattle, Wash. The profile information 1008 further indicates that the user's company typically makes visits of 3-6 hours in duration. The AOFC 124 can leverage these patterns in determining what AIIs should be included in (and excluded from) an activity cluster under development. For example, the AOFC 124 can exclude an AII that describes a trip when the destination of that trip lies outside the company's typical service area, and/or when the total mileage associated with the trip exceeds the company's normal visit travel time.

The profile information further specifies the structure of the company. In the example shown in FIG. 12, the profile information indicates that the company is a solely-owned corporation with one home office and fifty employees. The profile information also specifies the types of summary documents most frequently used by the company. The AOFC 124 and the SGC 128 can leverage this information in determining what types of reports to generate, if not explicitly chosen by the user. For example, assume that the AOFC 124 encounters a set of AIIs that make reference to work performed for a particular client. The AOFC 124 can access the company profile information to identify a summary document template to be used to generate an invoice document for that particular client.

FIG. 13 shows illustrative profile information for the user himself. This profile information shares some of the same features as the company's profile information. For example, the user's profile information describes the activity patterns associated with an individual user, which may vary somewhat from the activity patterns associated with the user's company as a whole. The user's profile information may also describe the summary document formats that this individual user prefers to use. Again, the AOFC 124 and SFG 128 can consult this information in generating summary documents.

FIG. 14 shows illustrative profile information regarding a client of the user's organization. Again, this profile information shares some of the same features as the company's profile information. And again, the AOFC 124 and SFG 128 can consult this information in generating summary documents.

The activity summary component 120 can extract information from the graph data structure 1102 by providing a GET API command to the output interface component 126. That command can specify the path to be used to extract a desired AII. For example, to extract a digital photograph from the graph data structure 1102, the activity summary component 120 can issue the request: https://graph/microsoft.com/vX.0/me/photo/$value. The "me" component of this path represents the user node 1004. The "photo/$value" component of this path represents a desired digital photograph linked to the user node 1004. The activity summary component 120 can more generally extract information regarding activities that occurred within a specified time span by providing one or more GET commands that specify that time span.

The input graph interface component 108 can add information to the graph data structure 1102 in response to receiving a PUT API command from a logic component. That command can specify the path that may be used to add information to the graph data structure 1102. In response to such a command, the input graph interface component 108 may add a new entity node to the graph data structure 1102, e.g., by adding a new trip node to the graph data structure 1102 when the user completes a new trip. Or the input graph interface component 108 can respond to a PUT API command by editing an existing node in the graph data structure 1102.

A.4. Illustrative AOFC and SGC

Figure 20:
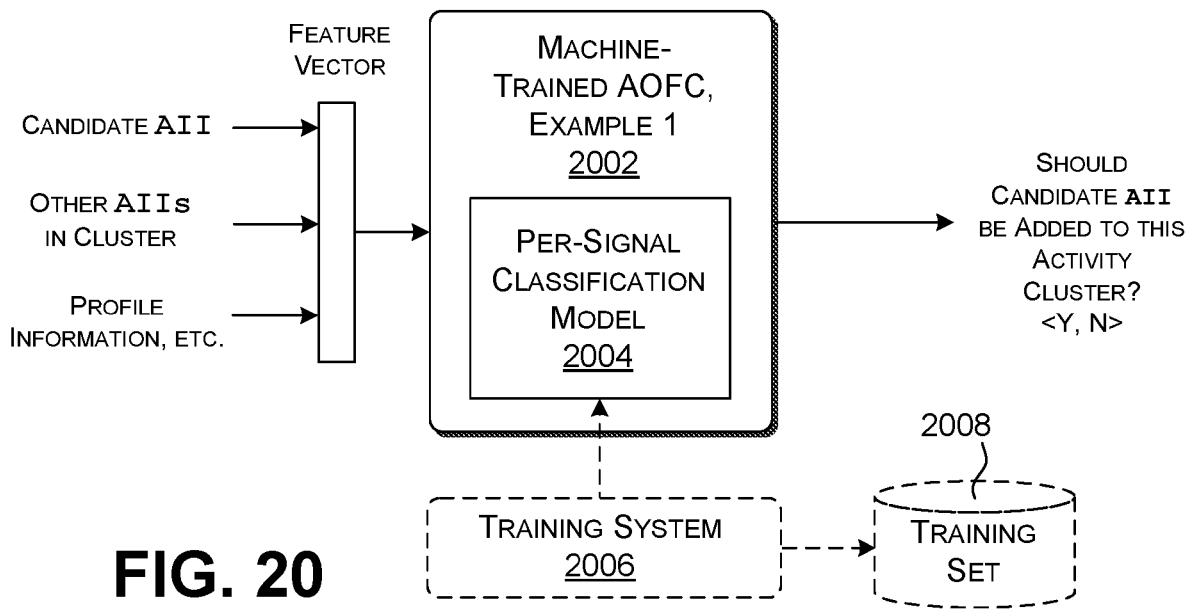
FIGS. 20 and 21 show two illustrative machine-trained components that the computing environment of FIG. 1 can use to identify activity clusters.
Figure 21:
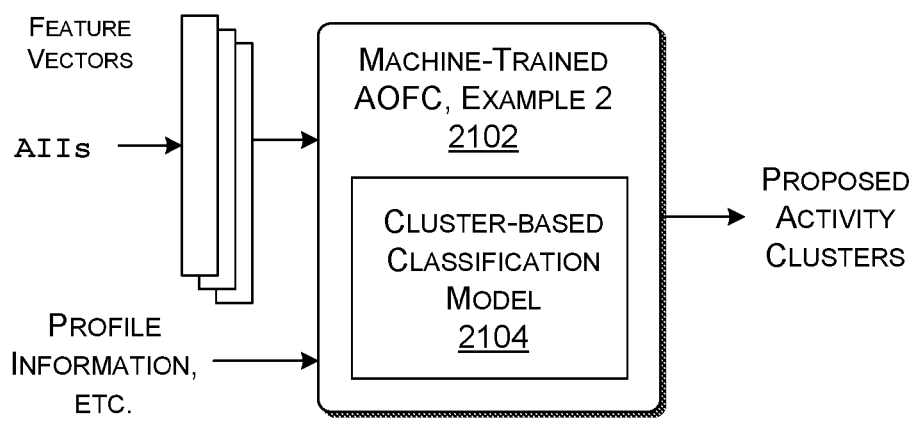
Figure 22:
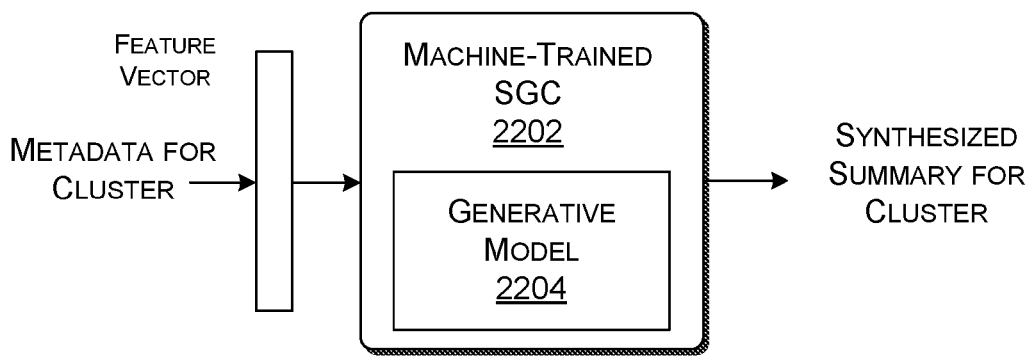
FIG. 22 shows an illustrative machine-trained component that the computing environment of FIG. 1 can use to generate summary documents.

FIGS. 15-19 respectively show five illustrative rules-based algorithms by which the computing environment 102 of FIG. 1 can identify activity clusters and generate summary documents. FIGS. 20-22 respectively show three illustrative machine-trained models for performing these tasks. Note that this subsection explains the operation of these components with respect to the non-limiting scenario shown in FIG. 3, in which an employee of a company performs work for one or more clients. The rules, algorithms, and models described below can be adapted to serve any other scenario.

Figure 15:
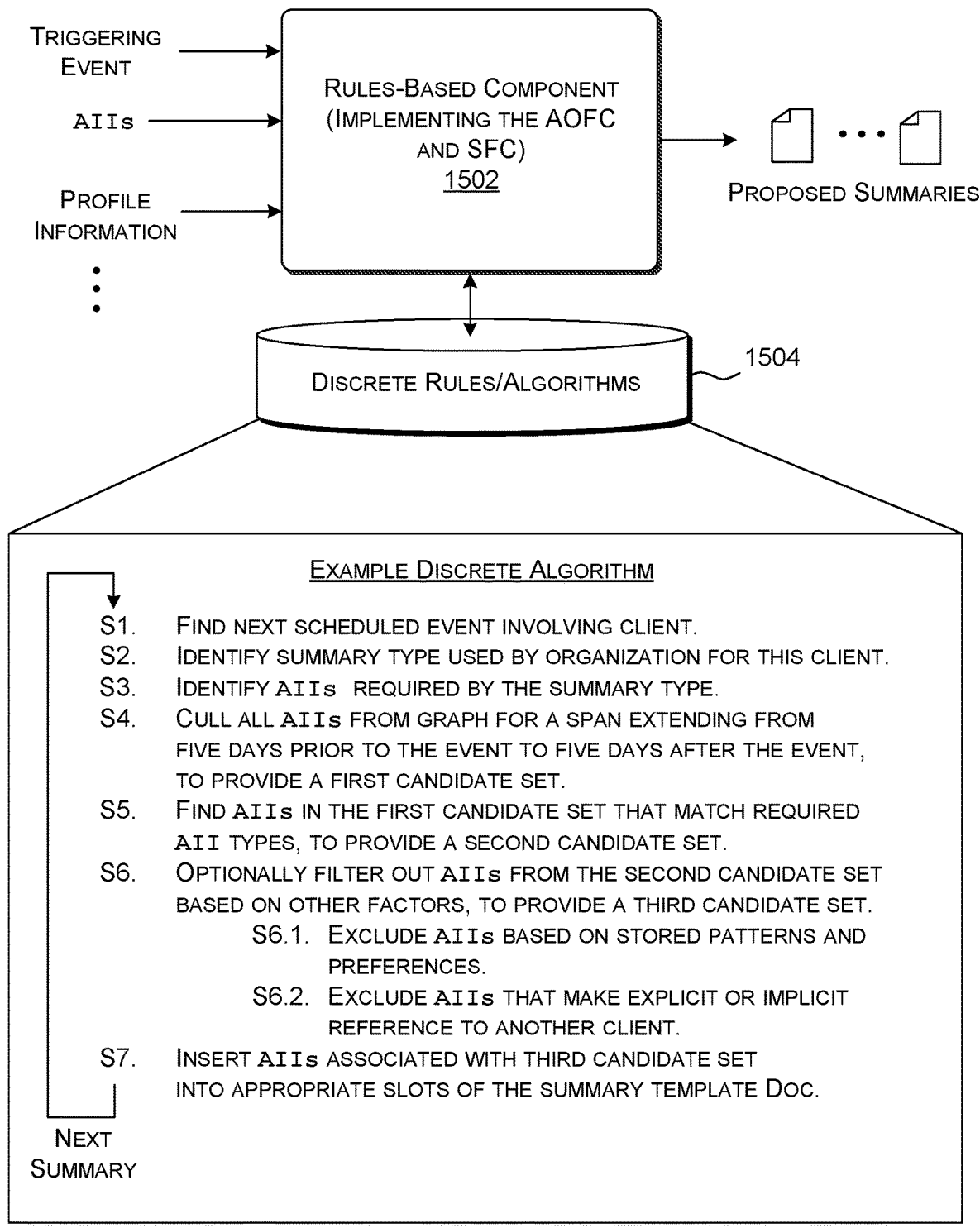
FIGS. 15-19 show five illustrative rules-based algorithms that the computing environment of FIG. 1 can use to identify activity clusters and generate summary documents.

Beginning with FIG. 15, this figure shows a rules-based component 1502 which implements both the AOFC 124 and the SFG 128. In performing its task, the rules-based component 1502 executes one or more discrete rules and/or algorithms provided in a data store 1504. FIG. 15 shows the steps of a first such algorithm.

In Step S1, the rules-based component 1102 searches a stream of AIIs within a specified span of time for a next scheduled event that makes reference to an existing client or a potential new client. For example, with reference to FIG. 3, the rules-based component 1102 can search the stream of AIIs to find a calendar event that indicates that the user is scheduled to visit a known client on a particular day, at a particular time. The rules-based component 1102 treats the calendar event as a seed AII for use in forming a new activity cluster. That is, the remainder of the algorithm adds AIIs to this activity cluster upon determination that they pertain to the same matter referenced by the calendar event associated with the seed AII.

The rules-based component 1502 can determine whether an entity corresponds to an existing client by determining whether there is an existing client node for this entity in the graph data structure 1102. The rules-based component 1502 can determine whether the entity corresponds to a new client based on one or more factors, such as whether the entity corresponds to the type of entity for which the user's company typically performs services, and is within the radius of the company's service area.

In Step S2, the rules-based component 1102 consults the graph data structure 1102 to determine the type(s) of summary document(s) to be used for the client visit. The rules-based component 1102 can consult the profile information stored in the graph data structure 1102 to find this information, for instance, by identifying the preferred summary document template(s) referenced by the user's individual profile information, and/or by the user's company profile information. In Step S3, the rules-based component 1502 examines each identified summary document template to determine the type of AIIs required to generate a summary document. The rules-based component 1502 can extract this information based on descriptive labels associated with the slots of each summary document template. To simplify explanation, assume hereafter that the rules-based component 1502 identifies a single summary document template.

In Step S4, the rules-based component 1502 culls all AIIs from the graph data structure 1102 within a time span which begins n days prior to the identified calendar event (corresponding to the seed AII), and which ends n days after the identified calendar event. Without limitation, n is five days in the example of FIG. 15. This step yields a first candidate set of AIIs. In Step S5, the rules-based component 1502 selects a subset of AIIs that are required to generate the specified type of summary document (identified in Step S3). This operation yields a second candidate set of AIIs.

In Step S6, the rules-based component 1502 further filters the second candidate set of AIIs based on various factors, to yield a third candidate set of AIIs. For example, the rules-based component 1502 can remove AIIs that do not conform to activity patterns specified in the profile information described in FIGS. 11-13. In addition, the rules-based component 1502 can remove AIIs that make explicit reference to another client (that is, corresponding to a client other than that specified in the calendar event which serves as the seed AII). For example, in FIG. 3, the stream of AIIs indicates that the user makes a call to a second client amidst performing work for a first client. The rules-based component 1502 can use a reverse telephone-number lookup table to determine that the user is interacting with a new client, and subsequently exclude that AII from the cluster under development. In Step S7, the rules-based component 1502 can generate a summary document by inserting the AIIs in the third candidate set into appropriate slots of the identified summary document template.

Figure 16:
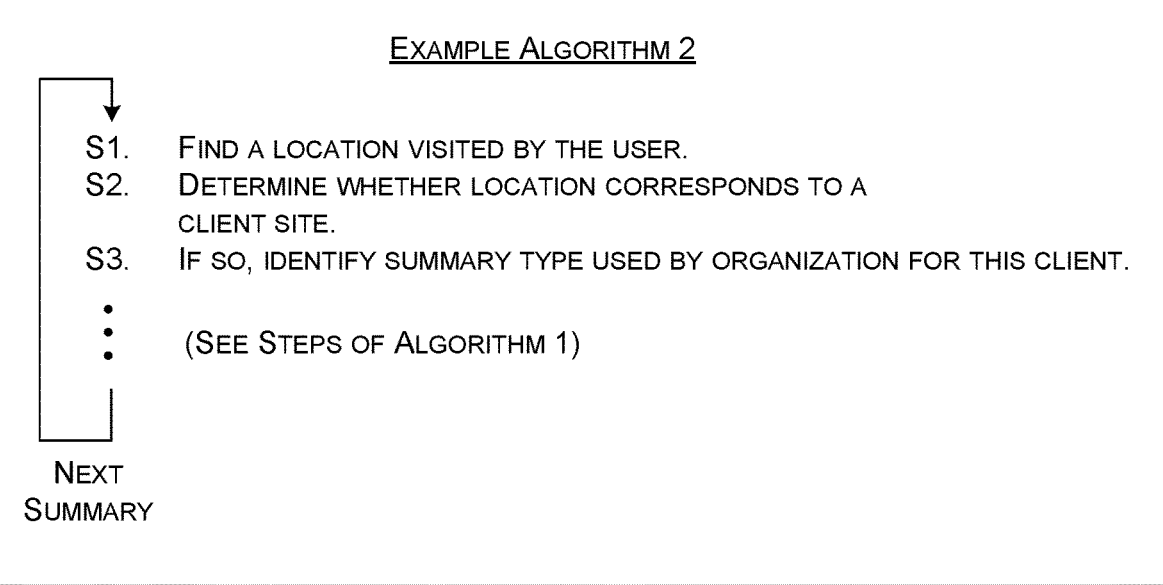

FIG. 16 shows a second algorithm that the rules-based component 1502 can use to interpret AIIs. The second algorithm corresponds to a variation of the algorithm described above with reference to FIG. 15. In Step S1 of the second algorithm, the rules-based component 1502 first scans a stream of AIIs for a location visited by the user, e.g., as conveyed by a movement-logging logic component or a visit-logging logic component. In Step S2, the rule-based component 1502 consults a location-to-entity lookup table to determine the entity name associated with the identified location. Upon confirming that the entity is an existing client or potential new client, the rules-based component 1502 uses this travel event as a seed AII for the formation of a new activity cluster, instead of choosing a calendar event (as in the previous algorithm). The rules-based component 1502 can then cull all AIIs from the graph data structure 1102 for a span extending from n days prior to the visit to n days after the visit. The remainder of the second algorithm may proceed in the same manner as the first algorithm of FIG. 15.

In an alternative implementation of the second algorithm, upon identifying the location of a trip, the rules-based component 1502 interrogates the graph data structure 1102 to find all events that have some nexus to the identified location. For example, the rules-based component 1502 can determine that the user logged various expenses at the location, and took various notes at the location. The rules-based component 1502 can also determine those events that are indirectly related to the identified location. For example, assume that the user prepared an inspection report following his visit based on photographs taken at the site. Insofar as the graph data structure 1102 contains a link which connects the inspection report to the original photographs, the rules-based component 1502 can identify the preparation of the inspection report as also relevant to the user's visit, and thus proper to include in the activity cluster being formed. In general, instead of, or in addition to, defining a fixed temporal window (as in the first algorithm), the rules-based component 1502 can identify all events in the graph data structure 1102 that are connected to the seed AII by no more than k edges or "hops."

Figure 17:
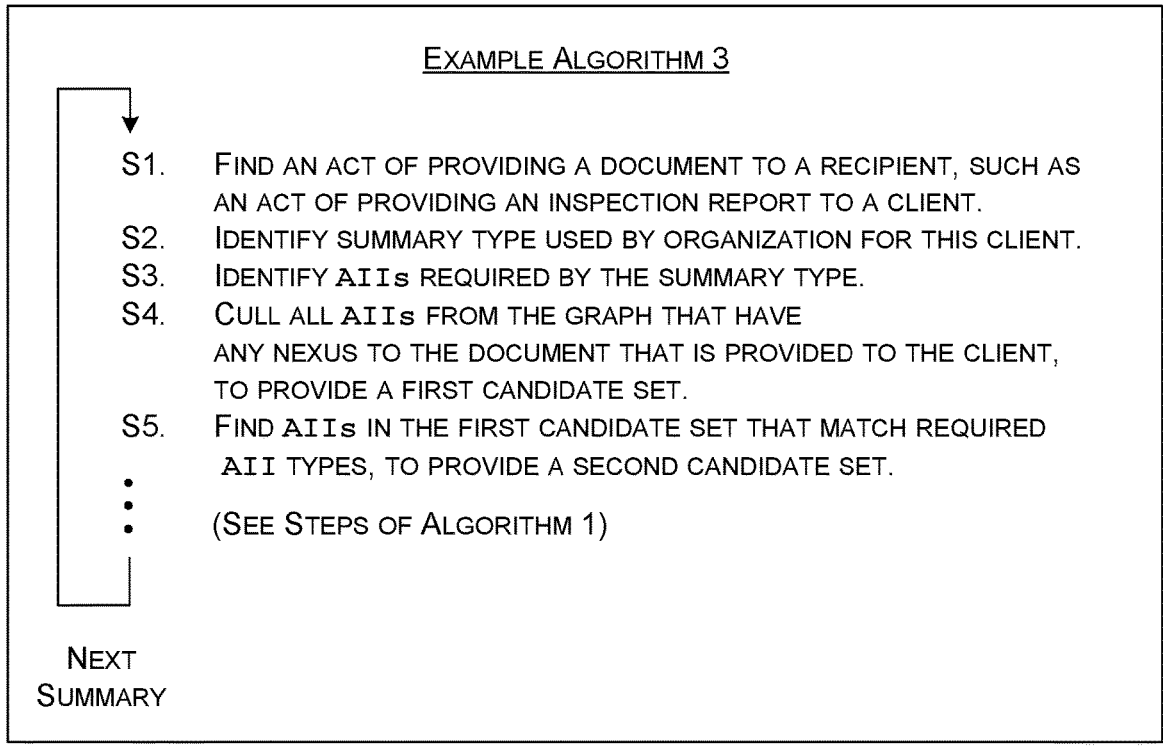

FIG. 17 shows a third algorithm that the rules-based component 1502 can use to interpret AIIs. In Step S1, the rules-based component 1502 searches a stream of AIIs to find an event that represents delivering a document (or other item) to an existing client or a potential new client. For instance, in the scenario of FIG. 3, the event corresponds to the delivery of an inspection report to a client. In Step S2, the rules-based component 1502 searches the profile information to find a summary report that is appropriate for the client under consideration. In Step S3, the rules-based component 1502 identifies the set of AIIs required to generate the identified summary document. In Step S4, the rules-based component 1502 can cull all AIIs in the graph data structure 1102 that have some nexus to the document identified in Step S1, to yield a first candidate set of AIIs. In other words, the rules-based component 1502 operates in the same manner described above, but uses the inspection report itself as the pivot to identify related activities, rather than location. In Step S5, the rules-based component 1502 selects that subset of AIIs in the first candidate set that match AIIs types required by the summary document template, to yield a second candidate set of AIIs. The remainder of the third algorithm may proceed in the same manner as the first algorithm of FIG. 15.

Figure 18:

FIG. 18 shows a fourth algorithm that the rules-based component 1502 can use to interpret AIIs. In Step S1, the rules-based component 1502 can receive the user's explicit selection of a seed AII. The user can make this selection by choosing a graphical card associated with a desired AII in a user interface presentation. In Step S2, the rules-based component 1502 can interrogate the graph data structure 1102 to find those AIIs that have any nexus to the chosen seed AII, to yield a first candidate set of AIIs. In Step S3, the rules-based component 1502 can determine the client name most commonly referenced in the first candidate set. The remainder of the fourth algorithm may proceed in the same manner as the first algorithm of FIG. 15.

Figure 19:
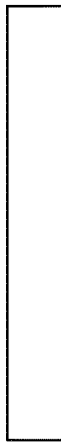

FIG. 19 shows a fifth algorithm that the rules-based component 1502 can use to interpret AIIs. In Step S1, the rules-based component 1102 can cull the AIIs from the graph data structure 1102 that have any nexus to an identified seed AII, in whatever manner that seed AII is chosen (examples of which are provided by the preceding algorithms). In Step S2, the rules-based component 1102 receives the user's explicit selection of a desired summary document template. The remainder of the fifth algorithm may proceed in the same manner as the first algorithm of FIG. 15.

FIG. 20 shows an illustrative machine-trained AOFC 2002 for determining whether a candidate AII should be added to an activity cluster under consideration. The machine-trained AOFC 2002 can choose an initial seed AII for the activity cluster based on any rule described above with respect to FIGS. 15-19. First, a feature-generating component (not shown) converts input information into one or more feature vectors. The machine-trained AOFC 2002 then maps the feature vector(s) into a binary classification result using a classification model 2004. The input information corresponds to metadata that describes the candidate AII under consideration, the AIIs currently associated with the activity cluster under consideration, and any profile information extracted from the graph data structure 1102. The classification result indicates whether the candidate AII should be added to the activity cluster under consideration.

The feature-generating component can convert the input information into one or more feature vectors in various ways. For example, the feature-generation component can convert individual pieces of metadata into separate feature vectors, e.g., using a predetermined metadata-to-vector lookup table. The feature-generating component can then concatenate these separate feature vectors into one or more global feature vectors.

The classification model 2004 can use any technique to generate the classification result. For example, the classification model 2004 can correspond to a logistic regression classifier, a support vector machine (SVM) classifier, a deep neural network (DNN) classifier, a decision tree classifier, etc. In one non-limiting example, the classification model 2004 can use a DNN to map a first feature vector associated with the candidate AII into a first output vector in a semantic space. It can use the same DNN to map a second feature vector that describes the activity cluster under consideration, in its current state, into a second output vector. The classification model 2004 then determines the distance (e.g., cosine similarity distance) between the first output vector and the second vector in the semantic space, to generate a similarity score. The machine-trained AOFC 2002 adds the candidate AII to the activity cluster if the score satisfies a prescribed threshold value.

More generally, a vector $z_j$ that defines the values of any layer j of a feed-forward DNN may be given by the formula: $z_j = f(W_j z_{j-1} + b_j)$, for $j=2, \ldots N$. The symbol $z_{j-1}$ refers to a vector of values in layer j−1. The symbol $W_j$ denotes a j-th machine-learned weight matrix, and the symbol $b_j$ refers to an optional j-th machine-learned bias vector. The activation function $f(x)$ can be formulated in different ways, such as the tanh function.

A training system 2006 produces the classification model 2004 based on training data provided in a data store 2008. The training data provides examples of positive instances in which a candidate AII belongs to an activity cluster under consideration, and negative instances in which a candidate AII does not belong to an activity cluster under consideration. The training system 2006 iteratively generates the classification model 2004 based on this data using any technique, such as gradient descent.

FIG. 21 shows a machine-trained AOFC 2102 that generates all of the activity clusters at the same time, instead constructing each activity cluster by successively adding AIIs to it (as in the case of the technique of FIG. 20). To perform this task, the machine-trained AOFC 2102 can use a feature-generating component (not shown) to convert a plurality of AIIs within a specified time span into respective feature vectors, e.g., using a predetermined metadata-to-vector lookup table. The machine-trained AOFC 2102 can then use any cluster-based classification model 2104 to form activity clusters, each of which describes a related set of AIIs. For example the cluster-based classification model 2104 can use a DNN to convert the feature vectors into respective output vectors in a semantic space, and then use the k-means clustering algorithm to cluster the output vectors into clusters. Each cluster describes an overarching task performed by the user. Although not shown, a training system can train the cluster-based classification model 2104 in the same manner described above.

The above-described machine-trained AOFC components are described in the spirit of illustration, not limitation. The AOFC 124 can use yet other types of machine-trained models to group AIIs into appropriate activity clusters. For example, the AOFC 124 can alternatively use a recurrent neural network (RNN) to dynamically detect activity clusters by processing a stream of AIIs (e.g., corresponding to the stream of AIIs shown in FIG. 3).

FIG. 22 shows an illustrative machine-trained SFG component 2102 that can generate summary documents without reference to a pre-generated summary document template. That is, in the examples described above, the SFC 128 generates a summary document by inserting AIIs associated with an identified activity cluster into appropriate slots of a pre-generated summary document template. By contrast, the machine-trained SFG component 2202 uses a generative model 2204 to directly translate a set of feature vectors (respectively associated with AIIs in an activity cluster) into the text of a summary document. The generative model 2204 can perform this function in any manner, such as by using a sequence-to-sequence model. In one implementation, the individual units in the sequence-to-sequence model can correspond to long short-term memory (LSTM) units. Although not shown, a training system can train the generative model based on training examples, each of which includes a set of AIIs associated with an activity cluster and an accepted summary document that is produced on the basis of that set of AIIs.

B. Illustrative Processes

Figure 24:
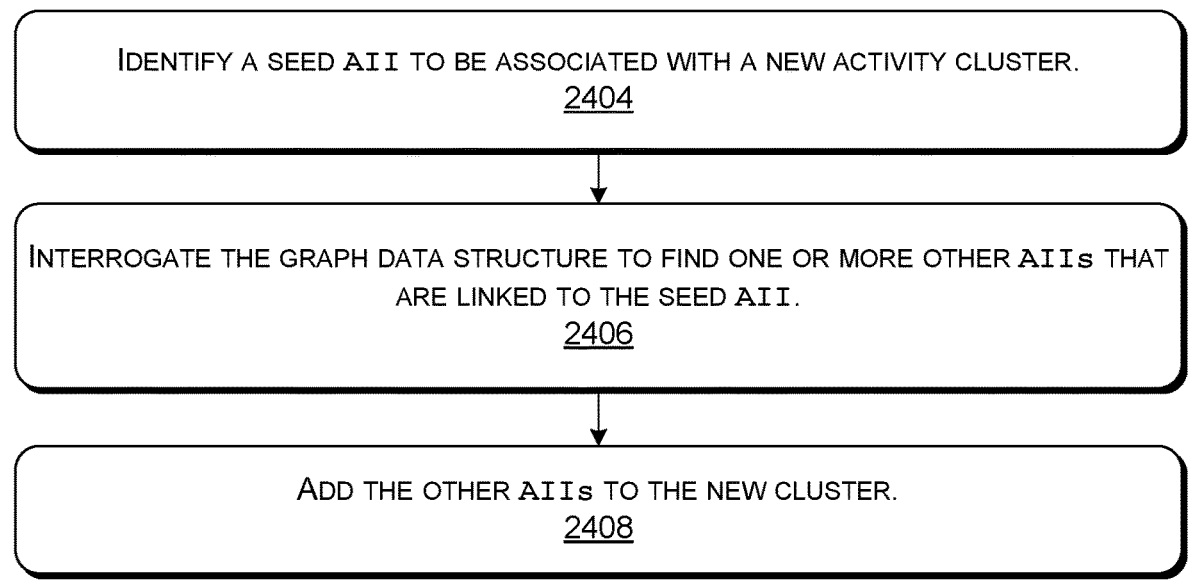
FIG. 24 is a flowchart that shows one illustrative manner of algorithmically building an activity cluster.

FIGS. 23 and 24 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

FIG. 23 shows a process 2302 that provides an overview of the operation of the computing environment 102. In block 2304, the computing environment 102 receives activity signals from plural logic components 104 running on one or more computing devices 106 associated with a subject (e.g., an individual user). Each activity signal includes an activity information item (AII) that describes an activity performed by the subject, or to be performed by the subject, as recorded by a logic component. In block 2306, the computing environment 102 stores AIIs extracted from the activity signals in a graph data structure 1102. The graph data structure 1102 includes nodes associated with respective entities, and links between the nodes that describe relationships among the entities. In block 2308, the computing environment 102 receives an invocation event that signals a start of a summary-preparation process. In block 2310, the computing environment 102 determines, by interrogating the graph data structure 1102, one or more activity clusters within a span of time, each activity cluster pertaining to a group of AIIs associated with a same encompassing project. The AIIs in each activity cluster are connected together by one or more links in the graph data structure 1102. In block 2312, the computing environment 102 generates, in at least a semi-automatic manner, one or more summary documents based on the activity cluster(s) that are identified in block 2312. In block 2314, the computing environment 102 sends the summary document(s) to an output device. In block 2316, the computing environment 102 presents, upon request by the user, one or more user interface presentations at any juncture in the method, including: an activity user interface presentation which shows a plurality of graphical cards, each card describing an AII; and/or a project overview user interface presentation that provides information regarding what phase or phases, if any, have been completed in a project that includes plural phases; and/or a summary document user interface presentation that displays information regarding summary documents that have been generated, or a synopsis thereof, etc.

FIG. 24 shows a process 2402 that represents one way of algorithmically building a new activity cluster. In block 2404, the rules-based component 1502 identifies a seed AII to be associated with a new activity cluster. The seed AII can correspond to any of: a calendar event; a location to which the subject has traveled; an act of forwarding a document to a recipient, etc. In block 2406, the rules-based component 1502 interrogates the graph data structure 1102 to find one or more other AIIs that are linked to the seed AII. In block 2408, the rules-based component 1502 adds the other AII(s) to the new cluster.

C. Representative Computing Functionality

Figure 25:
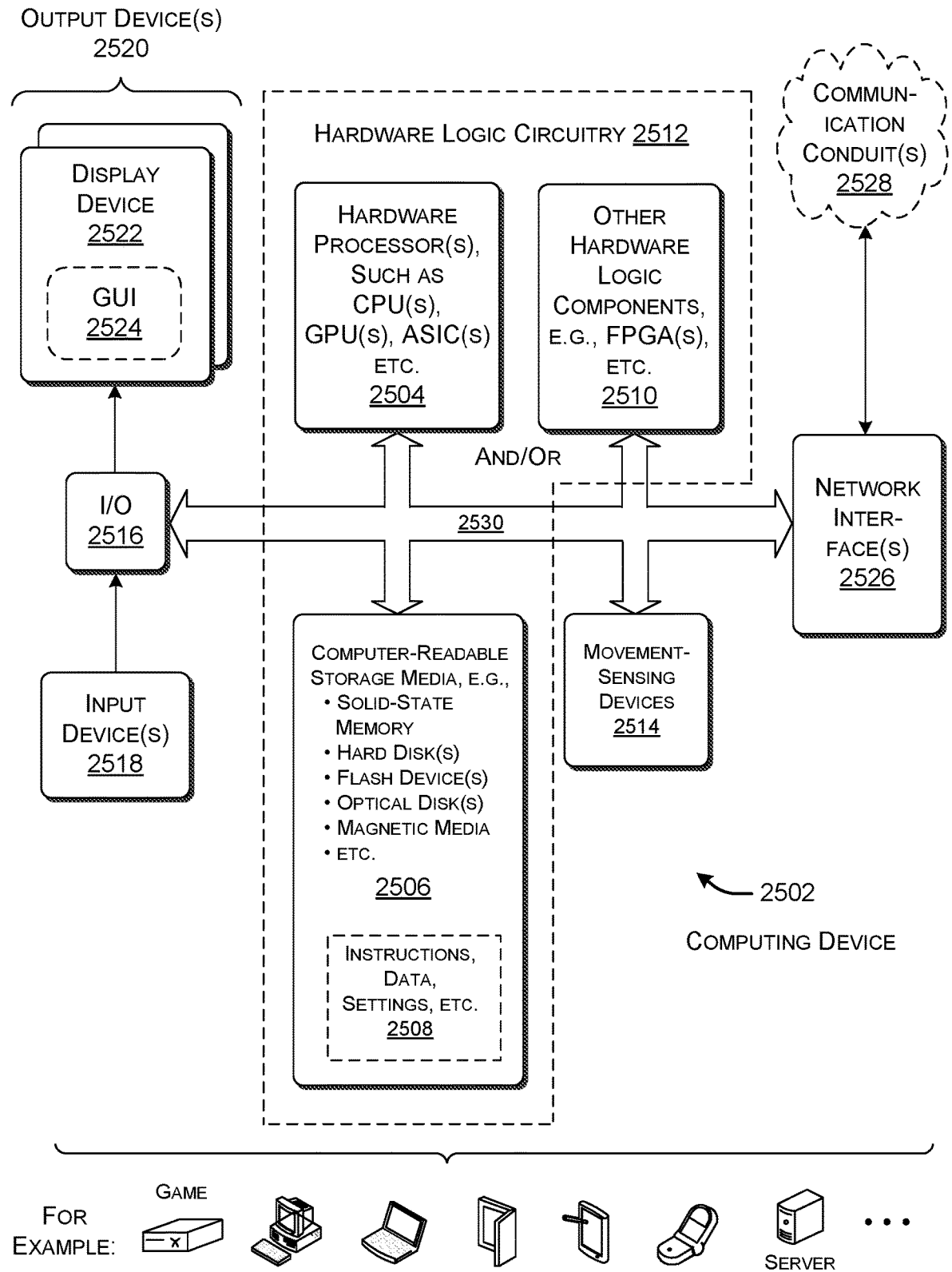
FIG. 25 shows an illustrative type of computing device that can be used to implement any aspect of the features shown in the foregoing drawings.

FIG. 25 shows a computing device 2502 that can be used to implement any aspect of the mechanisms set forth in the above-described figures. For instance, the type of computing device 2502 shown in FIG. 25 can be used to implement any server, any user computing device, etc. shown in FIG. 2. In all cases, the computing device 2502 represents a physical and tangible processing mechanism.

The computing device 2502 can include one or more hardware processors 2504. The hardware processor(s) 2504 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 2502 can also include computer-readable storage media 2506, corresponding to one or more computer-readable media hardware units. The computer-readable storage media 2506 retains any kind of information 2508, such as machine-readable instructions, settings, data, etc. Without limitation, for instance, the computer-readable storage media 2506 may include one or more solid-state devices, one or more magnetic hard disks, one or more optical disks, magnetic tape, and so on. Any instance of the computer-readable storage media 2506 can use any technology for storing and retrieving information. Further, any instance of the computer-readable storage media 2506 may represent a fixed or removable component of the computing device 2502. Further, any instance of the computer-readable storage media 2506 may provide volatile or non-volatile retention of information.

The computing device 2502 can utilize any instance of the computer-readable storage media 2506 in different ways. For example, any instance of the computer-readable storage media 2506 may represent a hardware memory unit (such as Random Access Memory (RAM)) for storing transient information during execution of a program by the computing device 2502, and/or a hardware storage unit (such as a hard disk) for retaining/archiving information on a more permanent basis. In the latter case, the computing device 2502 also includes one or more drive mechanisms (not shown) for storing and retrieving information from an instance of the computer-readable storage media 2506.

The computing device 2502 may perform any of the functions described above when the hardware processor(s) 2504 carry out computer-readable instructions stored in any instance of the computer-readable storage media 2506. For instance, the computing device 2502 may carry out computer-readable instructions to perform each block of the processes described in Section B.

Alternatively, or in addition, the computing device 2502 may rely on one or more other hardware logic components 2510 to perform operations using a task-specific collection of logic gates. For instance, the hardware logic component(s) 2510 may include a fixed configuration of hardware logic gates, e.g., that are created and set at the time of manufacture, and thereafter unalterable. Alternatively, or in addition, the other hardware logic component(s) 2510 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 25 generally indicates that hardware logic circuitry 2512 includes any combination of the hardware processor(s) 2504, the computer-readable storage media 2506, and/or the other hardware logic component(s) 2510. That is, the computing device 2502 can employ any combination of the hardware processor(s) 2504 that execute machine-readable instructions provided in the computer-readable storage media 2306, and/or one or more other hardware logic component(s) 2310 that perform operations using a fixed and/or programmable collection of hardware logic gates. More generally stated, the hardware logic circuitry 2512 corresponds to one or more hardware logic components of any type(s) that perform operations based on logic stored in and/or otherwise embodied in the hardware logic component(s).

In some cases (e.g., in the case in which the computing device 2502 represents a portable computing device), the computing device 2502 also includes one or more movement-sensing devices 2514 for detecting movement of the computing device 2502. The movement-sensing devices 2514 can include any of: a Global Positioning System (GPS) device; a device which determines the position of the computing device 2502 based on one or more terrestrial signal sources; one or more accelerometers; one or more gyroscopes; one or magnetometers, etc.

In some cases (e.g., in the case in which the computing device 2502 represents a user computing device), the computing device 2502 also includes an input/output interface 2516 for receiving various inputs (via input devices 2518) from a user, and for providing various outputs to the user (via output devices 2520). Illustrative input devices include a keyboard device, a mouse input device, a touchscreen input device, a digitizing pad, one or more static image cameras, one or more video cameras, one or more depth camera systems, one or more microphones, a voice recognition mechanism, and so on. One particular output mechanism may include a display device 2522 and an associated graphical user interface presentation (GUI) 2524. The display device 2522 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 2502 can also include one or more network interfaces 2526 for exchanging data with other devices via one or more communication conduits 2528. One or more communication buses 2530 communicatively couple the above-described components together. An optional battery (not shown) provides power to the computing device 2502 while disconnected from a constant supply of AC power.

The communication conduit(s) 2528 can be implemented in any manner, e.g., by a local area computer network, a wide area computer network (e.g., the Internet), point-to-point connections, etc., or any combination thereof. The communication conduit(s) 2528 can include any combination of hardwired links, wireless links, routers, gateway functionality, name servers, etc., governed by any protocol or combination of protocols.

FIG. 25 shows the computing device 2502 as being composed of a discrete collection of separate units. In some cases, the collection of units may correspond to discrete hardware units provided in a computing device chassis having any form factor. FIG. 25 shows illustrative form factors in its bottom portion. In other cases, the computing device 2502 can include a hardware logic component that integrates the functions of two or more of the units shown in FIG. 1. For instance, the computing device 2502 can include a system on a chip (SoC or SOC), corresponding to an integrated circuit that combines the functions of two or more of the units shown in FIG. 25.

The following summary provides a non-exhaustive set of illustrative aspects of the technology set forth herein.

According to a first aspect, a method, implemented by one or more computing devices, is described for assisting a user in generating activity summary documents. The method includes receiving a plurality of activity signals from plural logic components running on one or more computing devices associated with a subject, each activity signal including an activity information item (AII) that describes an activity performed by the subject, or to be performed by the subject, as recorded by a logic component. The plurality of activity signals include at least one movement signal, each movement signal including an AII that describes movement of the subject from a first location to a second location as logged by a movement-logging logic component, each movement signal being received from a portable computing device that includes one or more movement-sensing devices that detect movement of the portable computing device. The method further includes: storing AIIs extracted from the activity signals in a graph data structure, the graph data structure including nodes associated with respective entities, and links between the nodes that describe relationships among the entities; receiving an invocation event that signals a start of a summary-preparation process; determining, by interrogating the graph data structure, one or more activity clusters within a span of time, each activity cluster pertaining to a group of AIIs associated with a same encompassing project, the AIIs in each activity cluster being connected together by one or more links in the graph data structure; generating, in at least a semi-automatic manner, one or more summary documents based on the one or more activity clusters that are identified; and sending the one or more summary documents to an output device. The method further includes presenting, upon request by the user, one or more user interface presentations at any juncture in the method, including: an activity user interface presentation which shows a plurality of graphical cards, each card describing an AII; and/or a project overview user interface presentation that provides information regarding what phase or phases, if any, have been completed in at least one project that includes plural phases; and/or a summary document user interface presentation that displays information regarding the one or more summary documents.

According to a second aspect, the user interface presentations further include a cluster detail user interface presentation that identifies a proposed assignment of the AIIs to respective activity clusters, and According to a third aspect, related to the second aspect, the method further includes receiving an instruction from the user, via interaction by the user with the cluster detail user interface presentation, that requests that a specified AII be included in or excluded from an identified activity cluster.

According to a fourth aspect, one or more computing devices are described for assisting a user in generating summary documents. The computing device(s) include hardware logic circuitry, the hardware logic circuitry including: (a) one or more hardware processors that perform operations by executing machine-readable instructions stored in a memory, and/or (b) one or more other hardware logic components that perform operations using a task-specific collection of logic gates. The operations includes receiving a plurality of activity signals from plural logic components running on one or more computing devices associated with a subject, each activity signal including an activity information item (AII) that describes an activity performed by the subject, or to be performed by the subject, as recorded by a logic component. The plurality of activity signals includes at least one movement signal, each movement signal including an AII that describes movement of the subject from a first location to a second location as logged by a movement-logging logic component, each movement signal being received from a portable computing device that includes one or more movement-sensing devices that detect movement of the portable computing device. The operations further include: storing AIIs extracted from the activity signals in a graph data structure, the graph data structure including nodes associated with respective entities, and links between the nodes that describe relationships among the entities; receiving an invocation event that signals a start of a summary-preparation process; determining, by interrogating the graph data structure, one or more activity clusters within a span of time, each activity cluster pertaining to a group of AIIs associated with a same encompassing project, the AIIs in each activity cluster being connected together by one or more links in the graph data structure; generating, in at least a semi-automatic manner, one or more summary documents based on the one or more activity clusters that are identified; and sending the one or more summary documents to an output device.

According to a fifth aspect, related to the fourth aspect, the plurality of activity signals also includes at least one visit signal, each visit signal including an AII that describes an amount of time that a subject has spent at a specified site, as logged by a visit-logging logic component.

According to a sixth aspect, related to the fourth aspect, the plurality of activity signals also includes at least one document preparation signal, each document preparation signal including an AII that describes creation and/or editing of a document using a document-processing logic component.

According to a seventh aspect, related to the fourth aspect, the plurality of activity signals also includes at least one communication signal, each communication signal including an AII that describes communication by the subject with one or more people using a communication logic component.

According to an eighth aspect, related to the fourth aspect, the plurality of activity signals also includes at least one calendar signal produced by a calendar logic component, each calendar signal including an AII that describes an event which the subject is scheduled to attend.

According to a ninth aspect, related to the fourth aspect, the determining operation uses a rules-based component to identify the plurality of activity clusters.

According to an tenth aspect, related to the fourth aspect, the determining operation uses at least one machine-trained model to identify the plurality of clusters.

According to an eleventh aspect, related to the fourth aspect, the determining operation includes: identifying a seed AII to be associated with a new activity cluster; interrogating the graph data structure to find one or more other AIIs that are linked to the seed AII; and adding the one or more other AIIs to the new cluster.

According to a twelfth aspect, related to the eleventh aspect, the seed AII corresponds to: an event that is manually selected by the user; or a calendar event; or a location to which the subject has traveled; or an act of forwarding a document to a recipient.

According to a thirteenth aspect, related to the fourth aspect, the graph data structure includes at least: a node associated with a user; a node associated with an organization with which the user is affiliated; and a plurality of nodes associated with clients for whom the user performs work.

According to a fourteenth aspect, related to the fourth aspect, the graph data structure includes at least: a plurality of nodes associated with trips taken by the subject; and/or a plurality of nodes associated with documents created and/or edited by the subject; and/or a plurality of nodes associated with expenses incurred by the subject; and/or a plurality of nodes associated with events that the subject is scheduled to attend.

According to a fifteenth aspect, related to the fourth aspect, the operations further include presenting a user interface presentation to the user that shows a plurality of graphical cards, each card describing an AII within the span of time.

According to a sixteenth aspect, related to the fourth aspect, the operations further include receiving an instruction from the user, via interaction by the user with a user interface presentation, that requests that a specified AII be included in or excluded from an identified activity cluster.

According to a seventeenth aspect, related to the fourth aspect, the operations further include receiving an instruction from the user, via interaction by the user with a user interface presentation, that specifies a type of summary document to be generated.

According to an eighteenth aspect, related to the fourth aspect, the operations further include automatically determining a type of summary document to be generated based at least on profile information extracted from the graph data structure.

According to a nineteenth aspect, a computer-readable storage medium is described for storing computer-readable instructions. The computer-readable instructions, when executed by one or more hardware processors, perform a method that includes receiving a plurality of activity signals from plural logic components running on one or more computing devices associated with a subject, each activity signal including an activity information item (AII) that describes an activity performed by the subject, or to be performed by the subject, as recorded by a logic component. The plurality of activity signals include: at least one movement signal, each movement signal including an AII that describes movement of the subject from a first location to a second location as logged by a movement-logging logic component, each movement signal being received from a portable computing device that includes one or more movement-sensing devices that detect movement of the portable computing device; at least one document preparation signal, each document preparation signal including an AII that describes creation and/or editing of a document using a document-processing logic component; and at least one calendar signal, each calendar signal including an AII that describes an event which the subject is scheduled to attend. The method further includes: storing AIIs extracted from the activity signals in a graph data structure, the data structure including nodes associated with respective entities, and links between the nodes that describe relationships among the entities; receiving an invocation event that signals a start of a summary-preparation process; and determining, by interrogating the graph data structure, one or more activity clusters within a span of time, each activity cluster pertaining to a group of AIIs associated with a same encompassing project, the AIIs in each activity cluster being connected together by one or more links in the graph data structure. The determining operation includes, for at least one activity cluster: identifying a seed AII to be associated with a new activity cluster; interrogating the graph data structure to find one or more other AIIs that are linked to the seed AII; and adding the one or more other AIIs to the new cluster. The method further includes: generating, in at least a semi-automatic manner, one or more summary documents based on the one or more activity clusters that are identified; and sending the one or more summary documents to an output device.

According to a twentieth aspect, related to the nineteenth aspect, the method further includes presenting a user interface presentation to the user that shows a plurality of graphical cards, each card describing an AII within the span of time.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computing devices, for assisting a user in generating activity summary documents, comprising:
receiving a plurality of activity signals from plural computer programs running on one or more computing devices associated with a subject, the plural computer programs including computer programs that perform different respective functions,
each activity signal including an activity information item (AII) that corresponds to digital data that describes an activity performed by the subject, or to be performed by the subject, as recorded by a particular computer program, and
the plurality of activity signals including at least one movement signal, each movement signal including an AII that describes movement of the subject from a first location to a second location as logged by a movement-logging computer program, each movement signal being received from a portable computing device that includes one or more movement-sensing devices that detect movement of the portable computing device;
extracting AIIs from the activity signals, and storing the AIIs extracted from the activity signals in a graph data structure in response to commands submitted to a graph programming interface, the graph data structure being stored in a data store and including nodes that are digital data items associated with respective entities, and links between the nodes that describe relationships among the entities, each computer program being configured to interact with the graph data structure via the graph programming interface;
receiving an invocation event that signals a start of a summary-preparation process;

determining, by interrogating the graph data structure, by submitting commands to the graph programming interface, one or more activity clusters within a span of time, each activity cluster pertaining to a group of AIIs associated with a same encompassing project, the AIIs in each activity cluster being connected together by one or more links in the graph data structure;

generating, in at least a semi-automatic manner, one or more summary documents based on said one or more activity clusters that are identified;

sending said one or more summary documents to an output device; and presenting, upon request by the user, one or more user interface presentations on the output device at any juncture in the method, including:

an activity user interface presentation which shows a plurality of graphical cards, each card describing an AII; and/or a project overview user interface presentation that provides information regarding what phase or phases have been completed in at least one project that includes plural phases; and/or a summary document user interface presentation that displays information regarding said one or more summary documents.

2. The method of claim 1, wherein the user interface presentations further include a cluster detail user interface presentation that identifies a proposed assignment of the AIIs to respective activity clusters.

3. The method of claim 2, wherein the method further includes receiving an instruction from the user, via interaction by the user with a graphical control of the cluster detail user interface presentation, that requests that a specified AII be included in or excluded from an identified activity cluster.

4. One or more computing devices for assisting a user in generating summary documents, comprising:

hardware logic circuitry, the hardware logic circuitry including: (a) one or more hardware processors that perform operations by executing machine-readable instructions stored in a memory, and/or (b) one or more other hardware logic components that perform the operations using a task-specific collection of logic gates, the operations including:

receiving a plurality of activity signals from plural computer programs running on one or more computing devices associated with a subject, the plural computer programs including computer programs that perform different respective functions, each activity signal including an activity information item (AII) that corresponds to digital data that describes an activity performed by the subject, or to be performed by the subject, as recorded by a particular computer program, and the plurality of activity signals including at least one movement signal, each movement signal including an AII that describes movement of the subject from a first location to a second location as logged by a movement-logging computer program, each movement signal being received from a portable computing device that includes one or more movement-sensing devices that detect movement of the portable computing device;

extracting AIIs from the activity signals, and storing the AIIs extracted from the activity signals in a graph data structure in response to commands submitted to a graph programming interface, the graph data structure being stored in a data store and including nodes that are digital data items associated with respective entities, and links between the nodes that describe relationships among the entities, each computer program being configured to interact with the graph data structure via the graph programming interface;

receiving an invocation event that signals a start of a summary-preparation process;

determining, by interrogating the graph data structure, by submitting commands to the graph programming interface, one or more activity clusters within a span of time, each activity cluster pertaining to a group of AIIs associated with a same encompassing project, the AIIs in each activity cluster being connected together by one or more links in the graph data structure;

generating, in at least a semi-automatic manner, one or more summary documents based on said one or more activity clusters that are identified; and sending said one or more summary documents to an output device.

5. The one or more computing devices of claim 4, wherein the plurality of activity signals also includes at least one visit signal, each visit signal including an AII that describes an amount of time that the subject has spent at a specified site, as logged by a visit-logging computer program.

6. The one or more computing devices of claim 4, wherein the plurality of activity signals also includes at least one document preparation signal, each document preparation signal including an AII that describes creation and/or editing of a document using a document-processing computer program.

7. The one or more computing devices of claim 4, wherein the plurality of activity signals also includes at least one communication signal, each communication signal including an AII that describes communication by the subject with one or more people using a communication computer program.

8. The one or more computing devices of claim 4, wherein the plurality of activity signals also includes at least one calendar signal produced by a calendar computer program, each calendar signal including an AII that describes an event which the subject is scheduled to attend.

9. The one or more computing devices of claim 4, wherein said determining uses a rules-based component provided by the hardware logic circuitry to identify the plurality of activity clusters.

10. The one or more computing devices of claim 4, wherein said determining uses at least one machine-trained model provided by the hardware logic circuitry to identify the plurality of clusters.

11. The one or more computing devices of claim 4, wherein said determining includes:

identifying a seed AII to be associated with a new activity cluster;

interrogating the graph data structure via the graph programming interface to find one or more other AIIs that are linked to the seed AII; and adding said one or more other AIIs to the new cluster.

12. The one or more computing devices of claim 11, wherein the seed AII corresponds to:

an event that is manually selected by the user; or a calendar event; or a location to which the subject has traveled; or an act of forwarding a document to a recipient.

13. The one or more computing devices of claim 4, wherein the graph data structure includes at least:
   a node associated with the subject;
   a node associated with an organization with which the subject is affiliated; and
   a plurality of nodes associated with clients for whom the subject performs work.

14. The one or more computing devices of claim 4, wherein the graph data structure includes at least:
   a plurality of nodes associated with trips taken by the subject; and/or
   a plurality of nodes associated with documents created and/or edited by the subject; and/or
   a plurality of nodes associated with expenses incurred by the subject; and/or
   a plurality of nodes associated with events that the subject is scheduled to attend.

15. The one or more computing devices of claim 4, wherein the operations further include presenting a user interface presentation to the user that shows a plurality of graphical cards, each card describing an AII within the span of time.

16. The one or more computing devices of claim 4, wherein the operations further include receiving an instruction from the user, via interaction by the user with a graphical control of a user interface presentation, that requests that a specified AII be included in or excluded from an identified activity cluster.

17. The one or more computing devices of claim 4, wherein the operations further include receiving an instruction from the user, via interaction by the user with a graphical control of a user interface presentation, that specifies a type of summary document to be generated.

18. The one or more computing devices of claim 4, wherein the operations further include automatically determining a type of summary document to be generated based at least on profile information extracted from the graph data structure.

19. A computer-readable storage medium for storing computer-readable instructions, the computer-readable instructions, when executed by one or more hardware processors, performing a method that comprises:
   receiving a plurality of activity signals from plural computer programs running on one or more computing devices associated with a subject, the plural computer programs including computer programs that perform different respective functions, each activity signal including an activity information item (AII) that describes an activity performed by the subject, or to be performed by the subject, as recorded by a particular computer program, the plurality of activity signals including:
      at least one movement signal, each movement signal including an AII that describes movement of the subject from a first location to a second location as logged by a movement-logging computer program, each movement signal being received from a portable computing device that includes one or more movement-sensing devices that detect movement of the portable computing device;
      at least one document preparation signal, each document preparation signal including an AII that describes creation and/or editing of a document using a document-processing computer program; and
      at least one calendar signal, each calendar signal including an AII that describes an event which the subject is scheduled to attend;
   extracting AIIs from the activity signals, and storing the AIIs extracted from the activity signals in a graph data structure in response to commands submitted to a graph programming interface, the data structure being stored in a data store and including nodes that are digital data items associated with respective entities, and links between the nodes that describe relationships among the entities, each computer program being configured to interact with the graph data structure via the graph programming interface;
   receiving an invocation event that signals a start of a summary-preparation process;
   determining, by interrogating the graph data structure, by submitting commands to the graph programming interface, one or more activity clusters within a span of time, each activity cluster pertaining to a group of AIIs associated with a same encompassing project, the AIIs in each activity cluster being connected together by one or more links in the graph data structure,
   said determining including, for at least one activity cluster:
      identifying a seed AII to be associated with a new activity cluster;
      interrogating the graph data structure via the graph programming interface to find one or more other AIIs that are linked to the seed AII; and
      adding said one or more other AIIs to the new cluster;
   generating, in at least a semi-automatic manner, one or more summary documents based on said one or more activity clusters that are identified; and
   sending said one or more summary documents to an output device.

20. The computer-readable storage medium of claim 19, wherein the method further includes presenting a user interface presentation to a user that shows a plurality of graphical cards, each card describing an AII within the span of time.

* * * * *